United States Patent
Nakagawa

(10) Patent No.: US 11,119,368 B2
(45) Date of Patent: Sep. 14, 2021

(54) LIQUID CRYSTAL DISPLAY PANEL

(71) Applicants: Panasonic Liquid Crystal Display Co., Ltd., Himeji (JP); Pasona Knowledge Partner Inc., Osaka (JP)

(72) Inventor: Teruhisa Nakagawa, Hyogo (JP)

(73) Assignees: PANASONIC LIQUID CRYSTAL DISPLAY CO., LTD., Hyogo (JP); PASONA KNOWLEDGE PARTNER INC., Osaka (JP)

( * ) Notice: Subject to any disclaimer, the term of this patent is extended or adjusted under 35 U.S.C. 154(b) by 0 days.

(21) Appl. No.: 16/781,756

(22) Filed: Feb. 4, 2020

(65) Prior Publication Data

US 2020/0271999 A1   Aug. 27, 2020

(30) Foreign Application Priority Data

Feb. 27, 2019 (JP) ............................. JP2019-034631

(51) Int. Cl.
*G02F 1/1343* (2006.01)
*G02F 1/1368* (2006.01)

(52) U.S. Cl.
CPC ...... *G02F 1/134336* (2013.01); *G02F 1/1368* (2013.01); *G02F 1/134363* (2013.01);
(Continued)

(58) Field of Classification Search
CPC .............. G02F 1/13436; G02F 1/1368; G02F 2201/123; G02F 2001/134345; G02F 2001/134372; G02F 1/134363
See application file for complete search history.

(56) References Cited

U.S. PATENT DOCUMENTS 5,745,207 A   4/1998 Asada et al.
5,805,248 A   9/1998 Sakamoto et al.
(Continued)

FOREIGN PATENT DOCUMENTS

JP   9-105908    4/1997
JP   10-148826   6/1998
(Continued)

OTHER PUBLICATIONS

U.S. Appl. No. 16/777,402, filed Jan. 30, 2020.
(Continued)

*Primary Examiner* — Nathanael R Briggs
(74) *Attorney, Agent, or Firm* — Hamre, Schumann, Mueller & Larson, P.C.

(57) ABSTRACT

A liquid crystal display panel having a plurality of pixels arrayed in a matrix, the liquid crystal display panel comprising: a plurality of first signal lines; a transistor provided in each of the plurality of pixels; and a pixel electrode provided in each of the plurality of pixels, wherein, in each of the plurality of pixels, the pixel electrode includes a first pixel electrode and a second pixel electrode that are separated across the first signal line corresponding to the pixel and a bridge electrode that extends over the first signal line and connects the first pixel electrode and the second pixel electrode, the first pixel electrode has a plurality of first line electrodes extending in a first direction, and the second pixel electrode has a plurality of second line electrodes extending in a second direction different from the first direction.

13 Claims, 17 Drawing Sheets

(52) U.S. Cl.
CPC .. *G02F 1/134345* (2021.01); *G02F 1/134372* (2021.01); *G02F 2201/123* (2013.01)

(56) References Cited

U.S. PATENT DOCUMENTS

| | | | |
|---|---|---|---|
| 2001/0022569 | A1 | 9/2001 | Ohta et al. |
| 2008/0117156 | A1 | 5/2008 | Chen et al. |
| 2009/0128727 | A1 | 5/2009 | Yata |
| 2009/0256158 | A1 | 10/2009 | Xue |
| 2009/0262274 | A1 | 10/2009 | Noda et al. |
| 2014/0125899 | A1* | 5/2014 | Kim .................. G02F 1/134363 349/41 |
| 2016/0026048 | A1* | 1/2016 | Liu .................. G02F 1/136227 257/72 |
| 2016/0170276 | A1* | 6/2016 | Okita ................ G02F 1/136227 349/43 |
| 2017/0285380 | A1* | 10/2017 | Zhou ................. G02F 1/136227 |
| 2017/0371212 | A1 | 12/2017 | Du |
| 2018/0373105 | A1 | 12/2018 | Zhang |
| 2019/0056609 | A1* | 2/2019 | Kim ....................... G02F 1/1368 |
| 2019/0108811 | A1 | 4/2019 | Kim |
| 2019/0296048 | A1* | 9/2019 | Lee ....................... H01L 27/124 |

FOREIGN PATENT DOCUMENTS

| | | |
|---|---|---|
| JP | 2009-128466 | 6/2009 |
| JP | 2009-258729 | 11/2009 |
| JP | 2011-191791 | 9/2011 |

OTHER PUBLICATIONS

Office Action for the related U.S. Appl. No. 16/777,402, dated Oct. 20, 2020, 29 pages.
Final Office Action for U.S. Appl. No. 16/777,402, dated Mar. 1, 2021, 25 pages.
Office Action for the related U.S. Appl. No. 16/777,402, dated Jun. 7, 2021, 22 pages.

* cited by examiner

LIQUID CRYSTAL DISPLAY PANEL

CROSS-REFERENCE TO RELATED APPLICATION

This application claims priority from Japanese application JP 2019-034631, filed Feb. 27, 2019. This Japanese application is incorporated herein by reference.

BACKGROUND

1. Technical Field

The present disclosure relates to a liquid crystal display panel.

2. Description of the Related Art

A transverse electric field mode liquid crystal display panel having wide viewing angle characteristics is known. A mode for driving liquid crystal of a transverse electric field mode liquid crystal display panel includes, for example, an in-plane switching (IPS) mode and a fringe field switching (FFS) mode. In a transverse electric field mode liquid crystal display panel, each pixel includes a comb-shaped pixel electrode and a comb-shaped common electrode.

Transverse electric field mode liquid crystal display panels employing a multi-domain mode have also been proposed in order to improve color viewing angle characteristics. Liquid crystal display panels of an intra-pixel multi-domain (one-pixel multi-domain) type in which a plurality of domains is included in one pixel and liquid crystal display panels of a pixel-basis multi-domain (two-pixel multi-domain) type in which each of two pixels includes one domain are known as transverse electric field mode liquid crystal display panels employing a multi-domain mode.

For example, Unexamined Japanese Patent Publication No. H10-148826 discloses a transverse electric field mode liquid crystal display panel of an intra-pixel multi-domain type. Unexamined Japanese Patent Publication No. H09-105908 discloses a transverse electric field mode liquid crystal display panel of a pixel-basis multi-domain type.

SUMMARY

Although the transverse electric field mode liquid crystal display panel of an intra-pixel multi-domain type can provide excellent color viewing angle characteristics and wide viewing angle characteristics, an aperture ratio unfortunately decreases.

On the other hand, the transverse electric field mode liquid crystal display panel of a pixel-basis multi-domain type can suppress a decrease in aperture ratio, as compared to the transverse electric field mode liquid crystal display panel of an intra-pixel multi-domain type which can provide excellent color viewing angle characteristics, whereas viewing angle characteristics deteriorate.

The present disclosure has been made to solve such a problem, and aims to provide a liquid crystal display panel capable of suppressing a decrease in aperture ratio even when an intra-pixel multi-domain mode is employed.

In order to achieve the above object, a liquid crystal display panel according to one aspect of the first mode of the present disclosure is a liquid crystal display panel having a plurality of pixels arrayed in a matrix, the liquid crystal display panel including: a plurality of first signal lines extending in a row direction or a column direction; a transistor provided in each of the plurality of pixels; and a pixel electrode provided in each of the plurality of pixels and connected to the first signal line corresponding to the pixel via the transistor corresponding to the pixel, wherein, in each of the plurality of pixels, the pixel electrode includes a first pixel electrode and a second pixel electrode that are separated across the first signal line corresponding to the pixel, and a bridge electrode that extends over the first signal line and connects the first pixel electrode and the second pixel electrode, the first pixel electrode includes a plurality of first line electrodes extending in a first direction in a stripe pattern, and the second pixel electrode includes a plurality of second line electrodes extending in a stripe pattern in a second direction different from the first direction.

According to the present disclosure, a decrease in aperture ratio can be suppressed even in a liquid crystal display panel of an intra-pixel multi-domain type.

Figure 1:
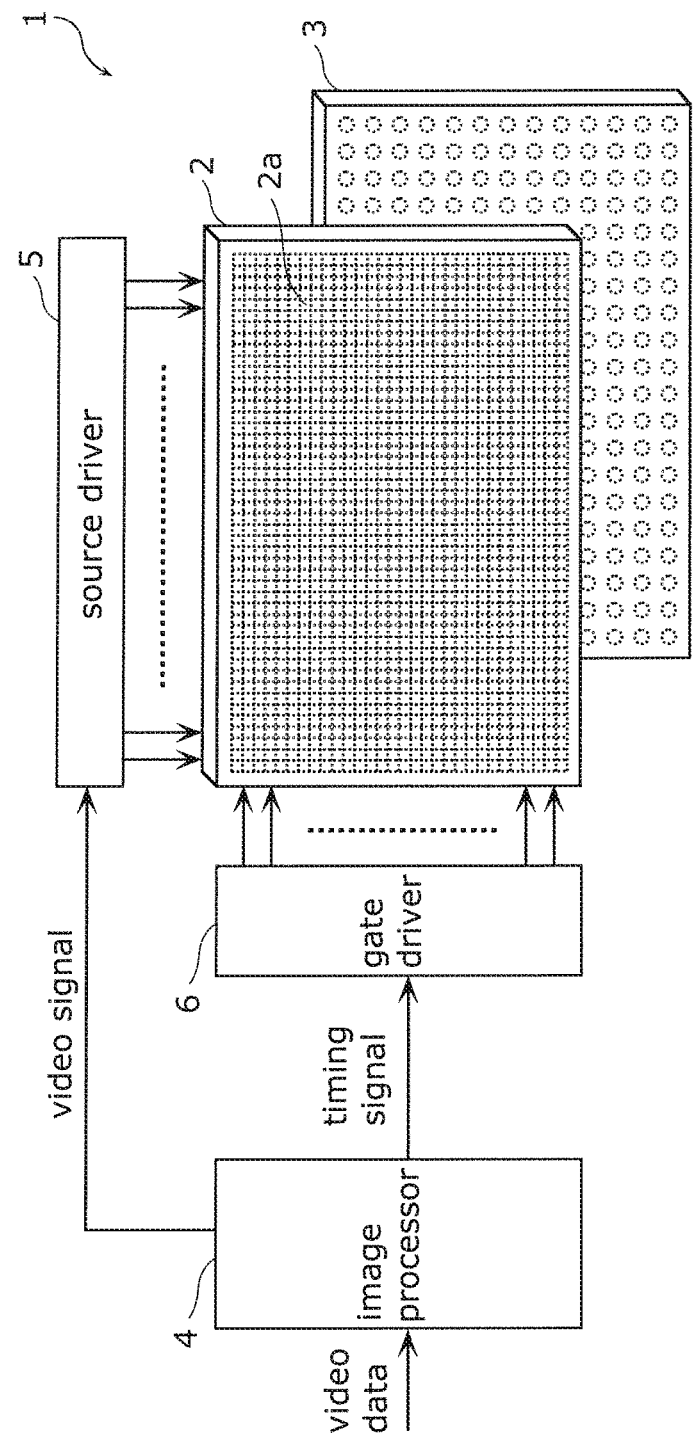
FIG. 1 is a diagram schematically showing the schematic configuration of liquid crystal display device according to the first exemplary embodiment.

Hereinafter, exemplary embodiments of the present disclosure will be described. The following exemplary embodiments illustrate a preferable specific example of the present disclosure. Thus, numerical values, shapes, materials, constituent elements, arrangement positions and connection forms of the constituent components, and the like illustrated in the following exemplary embodiments are merely examples, and are not intended to limit the present disclosure. Among the constituent elements in the following exemplary embodiments, the constituent elements not described in independent claims indicating the broadest concept of the present disclosure are described as optional constituent elements.

It should be noted that each of the diagrams is schematic, and is not necessarily strictly accurate. Accordingly, the scales and the like do not necessarily match in each drawing. In each figure, substantially the same constituent elements are denoted by the same reference numeral, and redundant description will be omitted or simplified.

First Exemplary Embodiment

Figure 2:
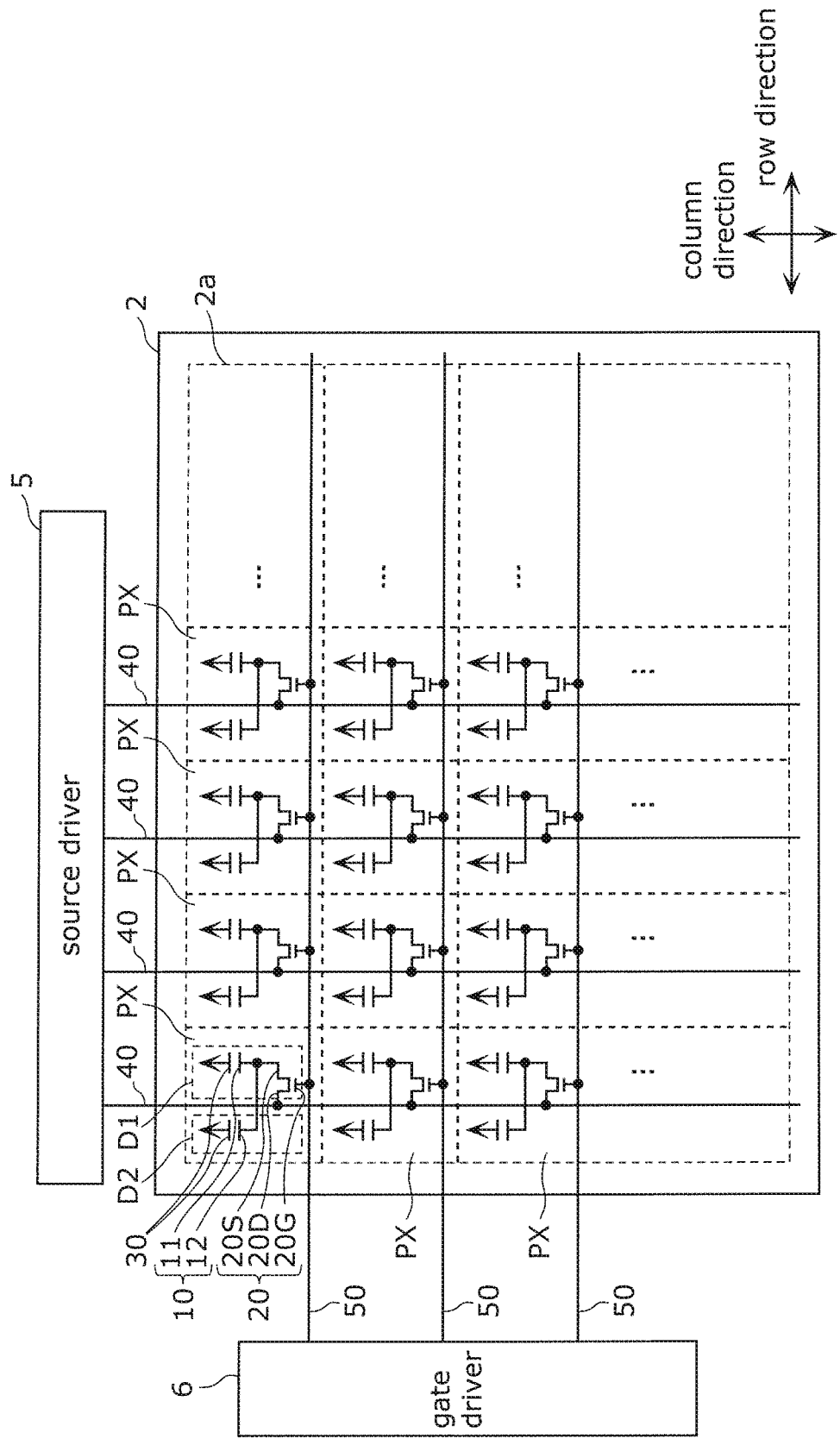
FIG. 2 is a diagram showing a pixel circuit of liquid crystal display panel according to the first exemplary embodiment.

First, a schematic configuration of liquid crystal display device 1 according to the first exemplary embodiment including liquid crystal display panel 2 will be described with reference to FIGS. 1 and 2. FIG. 1 is a diagram schematically showing the schematic configuration of liquid crystal display device 1 according to the first exemplary embodiment. FIG. 2 is a diagram showing a pixel circuit of liquid crystal display panel 2 according to the first exemplary embodiment.

Liquid crystal display device 1 is an example of an image display device, and displays a still image or a moving image (video image). As shown in FIG. 1, liquid crystal display device 1 includes liquid crystal display panel 2, backlight 3, and image processor 4.

Liquid crystal display panel 2 is disposed on the light emission side of backlight 3. Liquid crystal display panel 2 has image display region (active region) 2a in which an image is displayed. The mode for driving liquid crystal of liquid crystal display panel 2 is a transverse electric field mode such as IPS or FFS. Further, liquid crystal display panel 2 uses, for example, a normally black mode to control voltage, but the method for controlling voltage is not limited to the normally black mode.

As shown in FIGS. 1 and 2, liquid crystal display panel 2 has a plurality of pixels PX arrayed in a matrix. Image display region 2a is composed of a plurality of pixels PX.

As shown in FIG. 2, liquid crystal display panel 2 includes pixel electrodes 10 and transistors 20 respectively provided in the plurality of pixels PX, and common electrode 30 facing pixel electrodes 10. Liquid crystal display panel 2 also includes video signal lines (data lines) 40 that are a plurality of first signal lines extending in the column direction and scanning lines (gate lines) 50 that are a plurality of second signal lines extending in the row direction orthogonal to the column direction.

In each of the plurality of pixels PX, pixel electrode 10 is connected to video signal line 40 and scanning line 50 corresponding to pixel PX via transistor 20 corresponding to pixel PX.

Liquid crystal display panel 2 in the present exemplary embodiment is of an intra-pixel multi-domain type, and has a plurality of domains in one pixel PX. Specifically, each of the plurality of pixels PX has first domain D1 and second domain D2 that are separated in the row direction across video signal line 40 corresponding to pixel PX. That is, each pixel PX is divided into first domain D1 and second domain D2 across video signal line 40.

Pixel electrode 10 includes first pixel electrode 11 provided in first domain D1 and second pixel electrode 12 provided in second domain D2. That is, pixel electrode 10 is divided into first pixel electrode 11 and second pixel electrode 12 across video signal line 40. First pixel electrode 11 and second pixel electrode 12 that are separated in the row direction across video signal line 40 are connected by bridge electrode 13.

Transistors 20 of the respective pixels PX are arrayed along the direction in which scanning lines 50 extend. Specifically, each transistor 20 is provided at a position overlapping scanning line 50 in a planar view.

Transistor 20 is a thin film transistor and includes gate electrode 20G, source electrode 20S, and drain electrode 20D. Note that, in this specification, source electrode 20S and drain electrode 20D may be collectively referred to as a source/drain electrode, and the source/drain electrode refers to at least one of source electrode 20S and drain electrode 20D, either of source electrode 20S or drain electrode 20D, or both source electrode 20S and drain electrode 20D. In the present exemplary embodiment, each pixel PX has one transistor 20.

Similar to pixel electrode 10, common electrode 30 may be provided in each of the plurality of pixels PX, or may be provided to extend through the plurality of pixels PX. In the present exemplary embodiment, common electrode 30 is provided to extend through all pixels PX in image display region 2a. For example, common electrode 30 is a single planar electrode common to all pixels PX, and is formed over entire image display region 2a.

The plurality of video signal lines 40 is respectively connected to the source/drain electrodes of the transistors 20 of the plurality of pixels PX arrayed in the column direction. In the present exemplary embodiment, each video signal line 40 is connected to drain electrode 20D out of source electrode 20S and drain electrode 20D of each transistor 20. That is, in the present exemplary embodiment, video signal lines 40 are drain lines.

The plurality of scanning lines 50 is respectively connected to transistors 20 of the plurality of pixels PX arrayed in the row direction. Specifically, each scanning line 50 is connected to gate electrode 20G of each transistor 20.

As shown in FIG. 1, liquid crystal display panel 2 includes source driver 5 and gate driver 6 as a liquid crystal display panel drive circuit in order to display an image corresponding to an input video signal. Source driver 5 and gate driver 6 are driver ICs (IC packages), for example, and are mounted on a flexible wiring board such as a flexible flat cable (FFC) or a flexible printed circuit (FPC). For example, the flexible wiring board on which source driver 5 and gate driver 6 are mounted by chip on film (COF) is connected to an electrode terminal of liquid crystal display panel 2 by thermocompression using an anisotropic conductive film (ACF).

As shown in FIG. 2, source driver 5 is connected to video signal lines 40 of liquid crystal display panel 2. Source driver 5 supplies a voltage (data voltage) corresponding to the video signal input from image processor 4 to video signal lines 40 in accordance with the selection of scanning line 50 by gate driver 6.

Gate driver 6 is connected to scanning lines 50. Gate driver 6 selects pixel PX into which a video signal is written in accordance with a timing signal input from image processor 4, and supplies a voltage (gate-on voltage) that turns on transistor 20 of selected pixel PX to scanning line 50. As a result, the data voltage is supplied to pixel electrode 10 of selected pixel PX via transistor 20. Common electrode 30 is supplied with a common voltage from a common driver (not illustrated).

Thus, when the gate-on voltage is supplied from gate driver 6 to scanning line 50, transistor 20 of selected pixel PX is turned on, and the data voltage is supplied from video signal line 40 connected to transistor 20 to pixel electrode 10. An electric field is generated in a liquid crystal layer due to the difference between the data voltage supplied to pixel electrode 10 and the common voltage supplied to common electrode 30. This electric field changes the alignment state of the liquid crystal molecules in the liquid crystal layer in each pixel PX, and the transmittance of light which comes from backlight 3 and passes through liquid crystal display panel 2 is controlled for each pixel PX. As a result, a desired image is displayed in image display region 2a of liquid crystal display panel 2.

As shown in FIG. 1, backlight 3 is disposed on the back surface side of liquid crystal display panel 2, and irradiates liquid crystal display panel 2 with light. In the present exemplary embodiment, backlight 3 is an LED backlight including a light emitting diode (LED) as a light source. However, backlight 3 is not limited thereto. Backlight 3 is a direct LED backlight in which LEDs are two-dimensionally arrayed on a substrate so as to face liquid crystal display panel 2. However, backlight 3 may be of an edge type. Backlight 3 is a surface emitting unit that emits planar uniform scattered light (diffused light). Note that backlight 3 may have an optical member such as a diffusion plate (diffusion sheet) in order to diffuse light from the light source.

Image processor 4 is a control device that includes a computing processing circuit such as a CPU and a memory such as a ROM and a RAM. Video data to be displayed on liquid crystal display panel 2 is input to image processor 4. In image processor 4, the CPU reads out and executes a program stored in the memory, thereby executing various processes. Specifically, image processor 4 performs various image signal processes such as color adjustment on video data input from an external system (not illustrated) to generate a video signal indicating a gradation value of each pixel PX and a timing signal indicating a timing at which the video signal is written on each pixel PX, outputs the video signal to source driver 5, and outputs the timing signal to gate driver 6.

Figure 3:
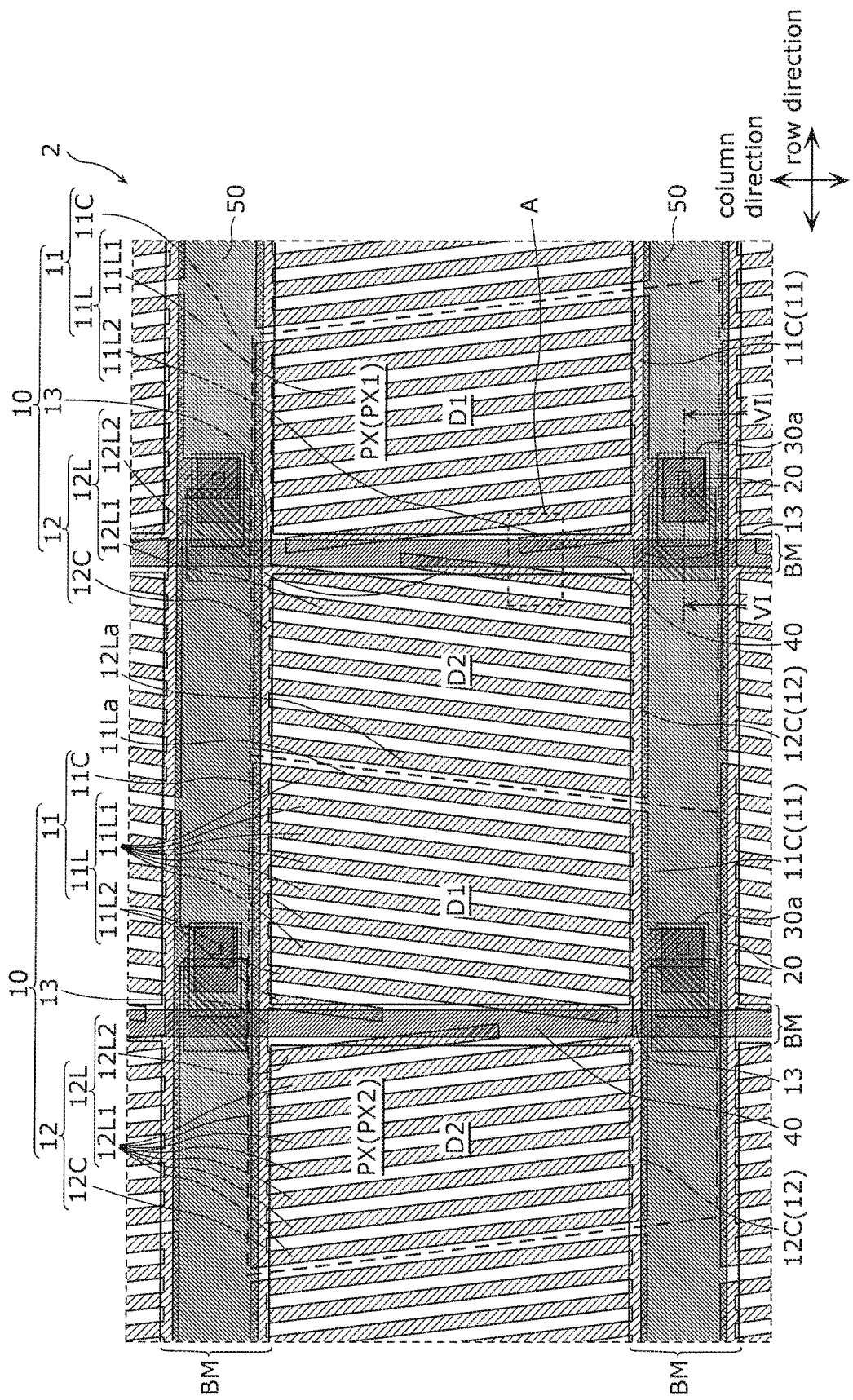
FIG. 3 is a plan view showing a layout of pixels of liquid crystal display panel according to the first exemplary embodiment.
Figure 4:
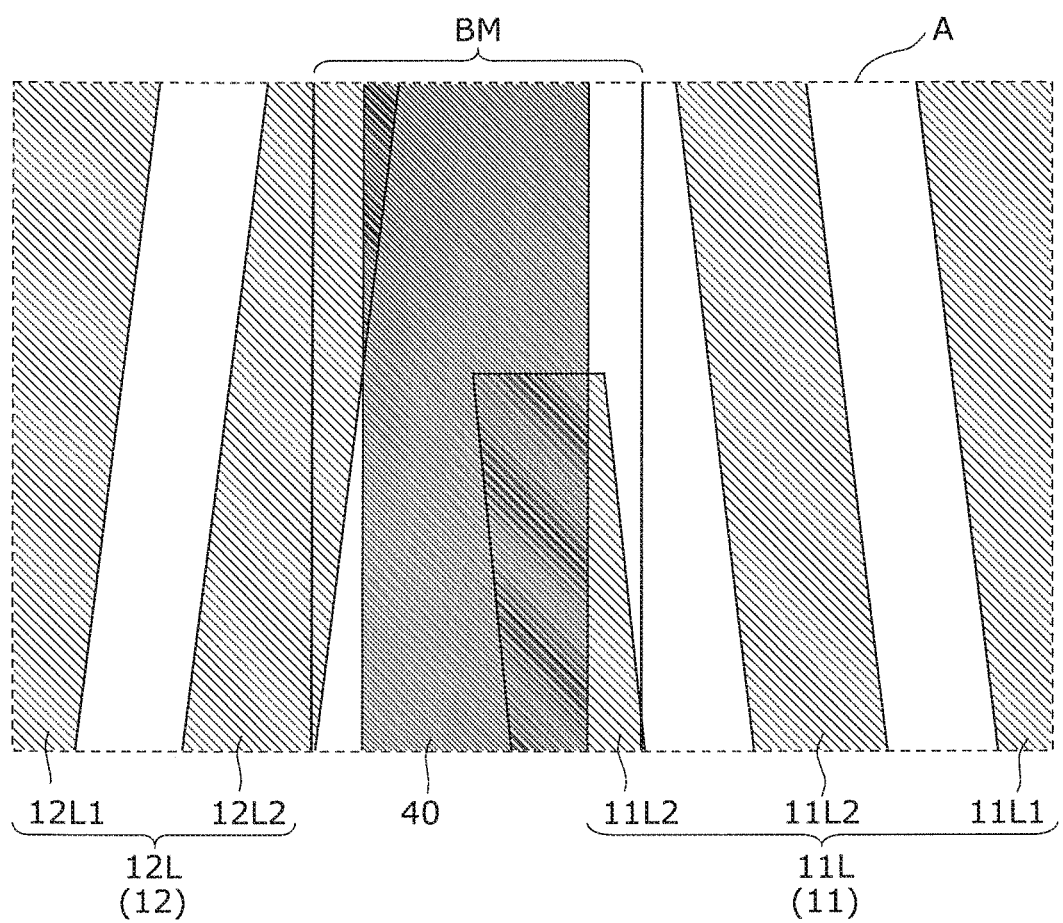
FIG. 4 is a partial enlarged view of pixels in liquid crystal display panel according to the first exemplary embodiment.

Next, a specific structure of liquid crystal display panel 2 according to the first exemplary embodiment will be described. First, the layout of pixels PX of liquid crystal display panel 2 will be described with reference to FIGS. 3 and 4 while referring to FIG. 2. FIG. 3 is a plan view showing a layout of pixels PX of liquid crystal display panel 2 according to the first exemplary embodiment. FIG. 4 is a partial enlarged view of liquid crystal display panel 2, and shows an enlarged view of region A enclosed by a dashed line in FIG. 3. In FIG. 3, one pixel PX is indicated by a region enclosed by a dashed trapezoid. When liquid crystal display panel 2 displays a color image, each of the plurality of pixels PX is any one of a red pixel, a green pixel, and a blue pixel. As an example, a red pixel, a green pixel, and a blue pixel are repeatedly arrayed in the row direction in a set of three.

As shown in FIG. 3, the video signal lines 40 extending in the column direction are each linear and formed so as to be parallel to each other. In the present exemplary embodiment, the plurality of video signal lines 40 has the same width.

Further, scanning lines 50 extending in the row direction are each linear and formed so as to be parallel to each other. In the present exemplary embodiment, the plurality of scanning lines 50 has the same width. Note that the width of one scanning line 50 is larger than the width of one video signal line 40.

Video signal lines 40 and scanning lines 50 are covered with black matrix BM. That is, video signal lines 40 and scanning lines 50 are not open at their tops.

As described above, each of the plurality of pixels PX includes first domain D1 and second domain D2 that are separated in the row direction across video signal line 40. Therefore, the boundary (domain boundary) between first domain D1 and second domain D2 overlaps black matrix BM (non-opening portion) that covers video signal lines 40.

As shown in FIG. 3, in each of the plurality of pixels PX, pixel electrode 10 includes first pixel electrode 11 and second pixel electrode 12 that are separated in the row direction across one video signal line 40 corresponding to pixel PX, and bridge electrode 13 that connects first pixel electrode 11 and second pixel electrode 12 over video signal line 40.

In each pixel PX, first pixel electrode 11 is provided in first domain D1, and second pixel electrode 12 is provided in second domain D2. First pixel electrode 11 provided in first domain D1 and second pixel electrode 12 provided in second domain D2 are connected by bridge electrode 13 that extends over video signal line 40. That is, video signal line 40 and bridge electrode 13 intersect in three dimensions.

In the present exemplary embodiment, first pixel electrode 11 and second pixel electrode 12 are connected by two bridge electrodes 13. However, the present disclosure is not limited thereto. For example, first pixel electrode 11 and second pixel electrode 12 may be connected using one bridge electrode 13, or may be connected using three or more bridge electrodes 13.

First pixel electrode 11 and second pixel electrode 12 are respectively formed with a plurality of slits, and thus, first pixel electrode 11 includes a plurality of first line electrodes 11L extending in a stripe pattern in a first direction, and second pixel electrode 12 includes a plurality of second line electrodes 12L extending in a stripe pattern in a second direction different from the first direction.

In other words, a plurality of first line electrodes 11L each have a strip shape, and are formed into a stripe pattern by forming a plurality of slits extending in the first direction in first pixel electrode 11. Similarly, a plurality of second line electrodes 12L each have a strip shape, and are formed into a stripe pattern by forming a plurality of slits extending in the second direction in second pixel electrode 12.

Further, in each pixel PX, the first direction that is an extending direction of first line electrodes 11L and the second direction that is an extending direction of second line electrodes 12L are not parallel to each other but intersect each other. In the present exemplary embodiment, the first direction that is the extending direction of first line electrodes 11L and the second direction that is the extending direction of second line electrodes 12L are inclined with respect to the row direction and the column direction.

In the present exemplary embodiment, in each pixel PX, the first direction that is the extending direction of the plurality of first line electrodes 11L and the second direction that is the extending direction of the plurality of second line electrodes 12L are line symmetric with respect to one video signal line 40 corresponding to pixel PX. That is, if the angle smaller than 90 degrees of the angles formed by the first direction and the column direction is θ, the angle smaller than 90 degrees of the angles formed by the second direction and the column direction is also θ.

The plurality of first line electrodes 11L include first ladder electrode portions 11L1 in which both ends in the longitudinal direction are connected in a ladder pattern by a pair of first connection electrodes 11C, and first finger electrode portions 11L2 in which one of both ends in the longitudinal direction is open without being connected by first connection electrode 11C. The pair of first connection electrodes 11C extends in the row direction in the vicinity of scanning lines 50.

Specifically, one ends in the longitudinal direction of first ladder electrode portions 11L1 are connected to each other by first connection electrode 11C on one side, and the other ends in the longitudinal direction are connected to each other by first connection electrode 11C on the other side.

On the other hand, one ends in the longitudinal direction of first finger electrode portions 11L2 are connected to each other by first connection electrode 11C on one side, while the other ends in the longitudinal direction are not connected to each other by first connection electrode 11C on the other side.

In the present exemplary embodiment, in the plurality of first line electrodes 11L, the number of first ladder electrode portions 11L1 is greater than the number of first finger electrode portions 11L2. First finger electrode portions 11L2 are first line electrodes 11L located on the video signal line 40 side from among the plurality of first line electrodes 11L. That is, first finger electrode portions 11L2 are first line electrodes 11L which extend over video signal line 40 when first line electrodes 11L extend from first connection electrode 11C on one side to first connection electrode 11C on the other side.

Similarly, the plurality of second line electrodes 12L include second ladder electrode portions 12L1 in which both ends in the longitudinal direction are connected in a ladder pattern by a pair of second connection electrodes 12C, and second finger electrode portions 12L2 in which one of both ends in the longitudinal direction is open without being connected by second connection electrode 12C. The pair of second connection electrodes 12C extends in the row direction in the vicinity of scanning lines 50.

Specifically, one ends in the longitudinal direction of second ladder electrode portions 12L1 are connected to each other by second connection electrode 12C on one side, and the other ends in the longitudinal direction are connected to each other by second connection electrode 12C on the other side.

On the other hand, one ends in the longitudinal direction of second finger electrode portions 12L2 are connected to each other by second connection electrode 12C on one side, while the other ends in the longitudinal direction are not connected to each other by second connection electrode 12C on the other side.

In the present exemplary embodiment, in the plurality of second line electrodes 12L, the number of second ladder electrode portions 12L1 is greater than the number of second finger electrode portions 12L2. Second finger electrode portions 12L2 are second line electrodes 12L located on the video signal line 40 side from among the plurality of second line electrodes 12L. That is, second finger electrode portions 12L2 are second line electrodes 12L which extend over video signal line 40 when second line electrodes 12L extend from second connection electrode 12C on one side to second connection electrode 12C on the other side.

In each of the plurality of pixels PX, the tip of at least one of the plurality of first line electrodes 11L from among the plurality of first line electrodes 11L and the tip of at least one of the plurality of second line electrodes 12L from among the plurality of second line electrodes 12L overlap video signal line 40 corresponding to pixel PX, when viewed in a planar view.

Specifically, as shown in FIGS. 3 and 4, the tip of first finger electrode portion 11L2 of the plurality of first line electrodes 11L overlaps video signal line 40 located on the boundary between first pixel electrode 11 and second pixel electrode 12. That is, the tip of first finger electrode portion 11L2 is located at the boundary (domain boundary) between first domain D1 and second domain D2, and thus, overlaps black matrix BM (non-opening portion) covering video signal line 40.

Similarly, the tip of second finger electrode portion 12L2 of the plurality of second line electrodes 12L overlaps video signal line 40 located on the boundary between first pixel electrode 11 and second pixel electrode 12. That is, the tip of second finger electrode portion 12L2 is located at the boundary (domain boundary) between first domain D1 and second domain D2, and thus, overlaps black matrix BM (non-opening portion) covering video signal line 40.

Figure 5:
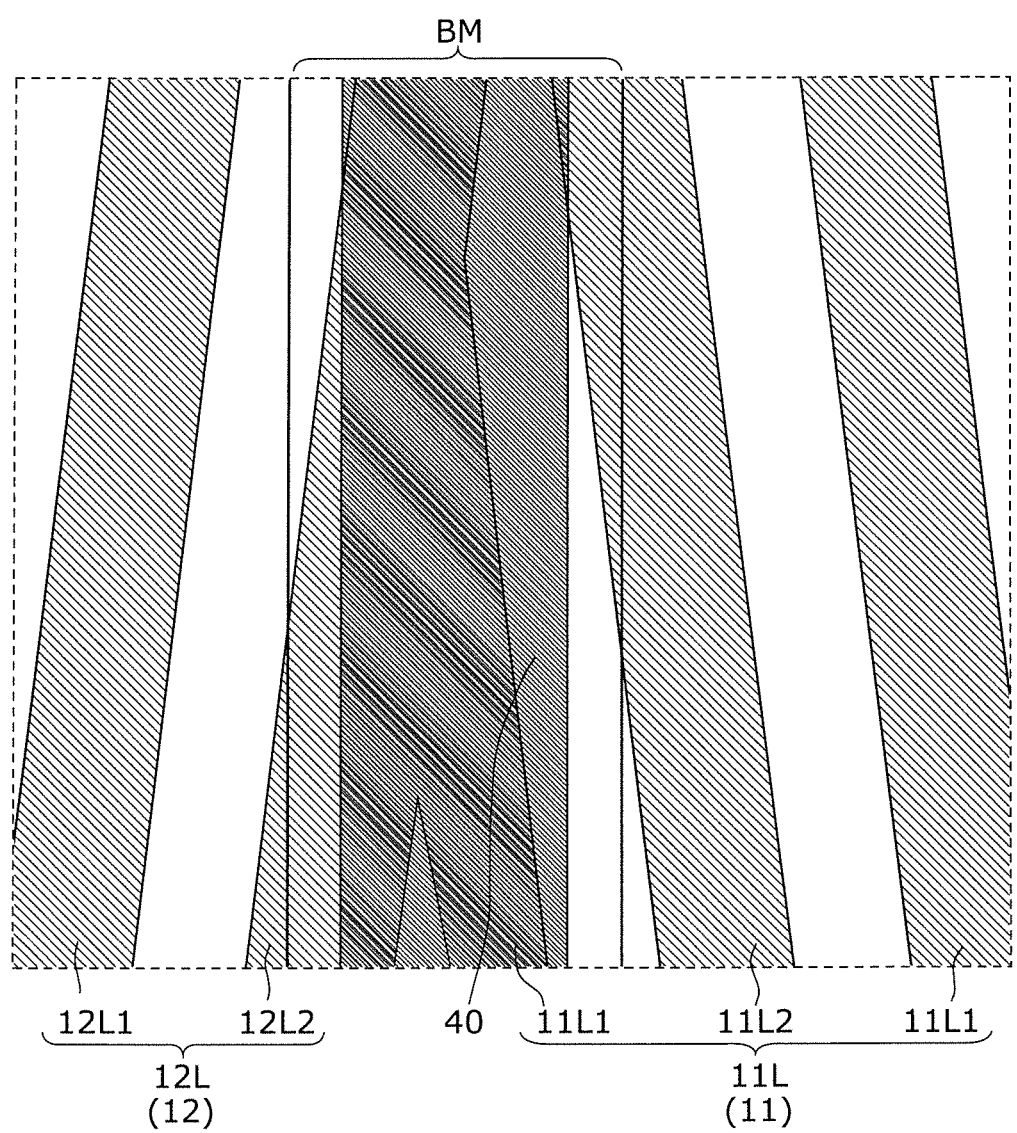
FIG. 5 is a partial enlarged view of another example of pixels in liquid crystal display panel according to the first exemplary embodiment.

In the present exemplary embodiment, first line electrode 11L of first pixel electrode 11 and second line electrode 12L of second pixel electrode 12 in each pixel PX are not connected to each other at a position overlapping video signal line 40 as shown in FIG. 4. However, the present disclosure is not limited thereto. For example, first line electrode 11L of first pixel electrode 11 and second line electrode 12L of second pixel electrode 12 in each pixel PX may be connected to each other at a position overlapping video signal line 40 as shown in FIG. 5. For example, first finger electrode portion 11L2 of first pixel electrode 11 and second finger electrode portion 12L2 of second pixel electrode 12 may be connected to each other.

In the present exemplary embodiment, in each pixel PX, all of first line electrodes 11L in first pixel electrode 11 are linearly formed with the same width, and are parallel to each other, as shown in FIG. 3. In first pixel electrode 11, the distance (slit width) between two adjacent first line electrodes 11L is constant. That is, all of first line electrodes 11L have the same pitch.

Similarly, in each pixel PX, all of second line electrodes 12L in second pixel electrode 12 are linearly formed with the same width, and are parallel to each other. In second pixel electrode 12, the distance (slit width) between two adjacent second line electrodes 12L is constant. That is, all of second line electrodes 12L have the same pitch.

In each pixel PX, first line electrodes 11L in first pixel electrode 11 and second line electrodes 12L in second pixel electrode 12 have the same width, and the pitch of first line electrodes 11L and the pitch of second line electrodes 12L are the same.

As shown in FIG. 3, when one pixel PX (right pixel in FIG. 3) of two pixels PX adjacent to each other in the row direction is defined as first pixel PX1, and the other pixel PX (left pixel in FIG. 3) of two pixels PX adjacent to each other in the row direction is defined as second pixel PX2, second pixel electrode 12 of first pixel PX1 and first pixel electrode 11 of second pixel PX2 are located between two adjacent video signal lines 40. That is, the plurality of second line electrodes 12L of first pixel PX1 and the plurality of first line electrodes 11L of second pixel PX2 are provided between two adjacent video signal lines 40.

In this case, second end electrode 12La located closest to first line electrodes 11L of second pixel PX2 from among the plurality of second line electrodes 12L in first pixel PX1 and first end electrode 11La located closest to second line electrodes 12L of first pixel PX1 from among the plurality of first line electrodes 11L in second pixel PX2 are adjacent to each other.

In the present exemplary embodiment, in first pixel PX1 and second pixel PX2 that are adjacent to each other in the row direction, the second direction that is the extending direction of the plurality of second line electrodes 12L in first pixel PX1 and the first direction that is the extending direction of the plurality of first line electrodes 11L in second pixel PX2 are the same. That is, in first pixel PX1 and second pixel PX2 that are adjacent to each other in the row direction, the plurality of second line electrodes 12L in first pixel PX1 and the plurality of first line electrodes 11L in second pixel PX2 are parallel to each other. Therefore, the plurality of first line electrodes 11L and the plurality of second line electrodes 12L which exist between two adjacent video signal lines 40 and which are pixel electrodes in different pixels PX are formed as a continuous pixel electrode extending in the same direction.

Note that, in two pixels which are first pixel PX1 and second pixel PX2 adjacent to each other in the row direction, the first direction that is the extending direction of the plurality of first line electrodes 11L in first pixel PX1 and the second direction that is the extending direction of the plurality of second line electrodes 12L in second pixel PX2 are also the same.

Figure 6:
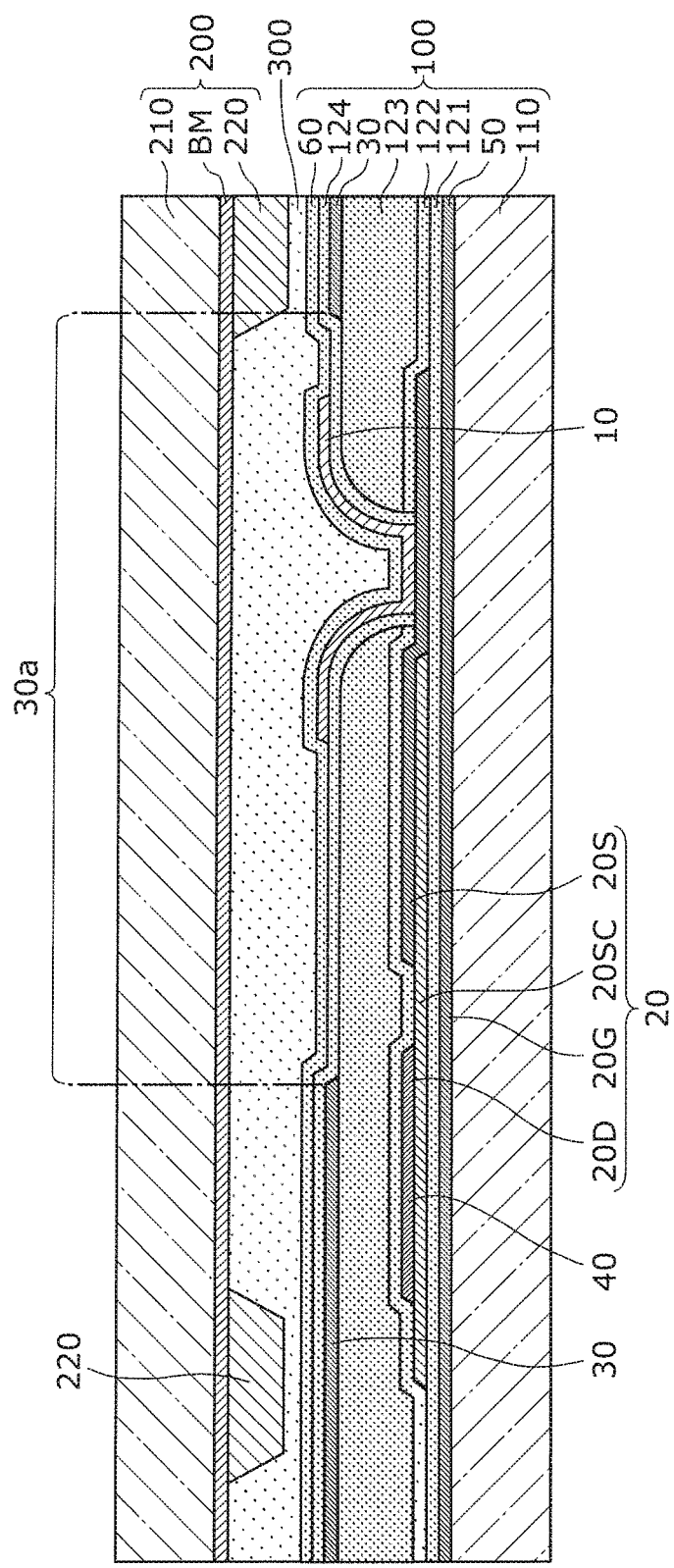
FIG. 6 is a sectional view of liquid crystal display panel according to the first exemplary embodiment.

Next, the cross-sectional structure of liquid crystal display panel 2 will be described with reference to FIG. 6 while referring to FIGS. 2 and 3. FIG. 6 is a sectional view of liquid crystal display panel 2 taken along line VI-VI in FIG. 3.

As shown in FIG. 6, liquid crystal display panel 2 includes first substrate 100, second substrate 200 facing first substrate 100, and liquid crystal layer 300 disposed between first substrate 100 and second substrate 200. Although not shown, liquid crystal layer 300 is sealed between first substrate 100 and second substrate 200 by a frame-shaped sealing member.

First substrate 100 is a TFT substrate having TFTs as transistors 20. Specifically, first substrate 100 is an active matrix substrate in which a plurality of transistors 20 is arranged in a matrix. First substrate 100 includes not only transistors 20 but also various wirings such as video signal lines 40 and scanning lines 50, an interlayer insulating film that insulates these wirings from each other, pixel electrodes 10, common electrode 30, alignment film 60, etc. These components are formed on first transparent base 110. First transparent base 110 is a transparent substrate such as a glass substrate, for example.

Each of transistors 20 formed on first transparent base 110 includes gate electrode 20G, source electrode 20S, drain electrode 20D, and semiconductor layer 20SC serving as a channel layer. In the present exemplary embodiment, transistor 20 is a TFT having a bottom gate structure, and includes gate electrode 20G formed on first transparent base 110, first insulating film 121 formed on gate electrode 20G and serving as a gate insulator, and semiconductor layer 20SC formed above gate electrode 20G with first insulating film 121 interposed therebetween. Source electrode 20S and drain electrode 20D are formed on semiconductor layer 20SC.

For example, gate electrode 20G may be formed of a metal film having a two-layer structure of a molybdenum film and a copper film, or may be formed of a single-layer metal film made of a copper film or the like. First insulating film 121 may be formed of, for example, an insulating film having a two-layer structure of a silicon oxide film and a silicon nitride film, or may be formed of a single-layer insulating film made of a silicon oxide film or a silicon nitride film. Semiconductor layer 20SC may be formed of, for example, a semiconductor film having a two-layer structure of an i-amorphous silicon film and an n-amorphous silicon film, or may be formed of a single-layer semiconductor film. Source electrode 20S and drain electrode 20D may be formed of, for example, a metal film having a two-layer structure of a molybdenum film and a copper film, or may be formed of a single-layer metal film made of a copper film or the like.

Note that the materials of gate electrode 20G, source electrode 20S, drain electrode 20D, semiconductor layer 20SC, and first insulating film 121 are not limited to the materials described above. For example, as a material of semiconductor layer 20SC, an In—Ga—Zn—O oxide semiconductor may be used.

As shown in FIG. 6, video signal lines 40 and scanning lines 50 are formed on first substrate 100. Video signal line 40 is formed in the same metal layer as source electrode 20S and drain electrode 20D. That is, video signal line 40, source electrode 20S, and drain electrode 20D are formed by patterning the same metal film. On the other hand, scanning line 50 is formed in the same metal layer as gate electrode 20G. That is, scanning line 50 and gate electrode 20G are formed by patterning the same metal film.

As shown in FIG. 6, in the present exemplary embodiment, source electrode 20S of transistor 20 is connected to pixel electrode 10 through a contact hole. Specifically, source electrode 20S is connected to first pixel electrode 11 of pixel electrode 10. Drain electrode 20D of transistor 20 is connected to video signal line 40.

Second insulating film 122 is formed on first transparent base 110 so as to cover transistors 20, video signal lines 40, and scanning lines 50. Second insulating film 122 is formed of, for example, an inorganic insulating film made of an inorganic material such as a silicon nitride film. Second insulating film 122 which is an inorganic insulating film can be formed by, for example, a chemical vapor deposition (CVD) method.

Further, third insulating film 123 is formed so as to cover second insulating film 122. In the present exemplary embodiment, the thickness of third insulating film 123 is greater than the thickness of second insulating film 122. Specifically, the thickness of third insulating film 123 is four times or more the thickness of second insulating film 122, and is 3000 nm, for example. Thus, the distance in the thickness direction between the wirings such as video signal line 40 and scanning line 50 and common electrode 30 can be increased, so that the parasitic capacitance formed by the wirings such as video signal line 40 and scanning line 50 and common electrode 30 can be reduced. In addition, when the thickness of third insulating film 123 is increased, unevenness of the TFT layer caused by forming transistors 20, video signal lines 40, and scanning lines 50 is reduced, whereby the TFT layer can be flattened. As a result, third insulating film 123 having a flattened surface can be formed, so that common electrode 30 immediately above third insulating film 123 can be formed in a flat planar shape.

In the present exemplary embodiment, third insulating film 123 is composed of an organic insulating film made of an organic material containing carbon. Third insulating film 123, which is an organic insulating film, can be formed, for example, by applying and curing a liquid organic material. Thus, third insulating film 123 can be easily thickened, and the surface of third insulating film 123 can be easily flattened throughout all pixels PX. That is, third insulating film 123 functions as a flattened layer.

Further, pixel electrode 10 and common electrode 30 are formed on first substrate 100. Specifically, pixel electrode 10 and common electrode 30 are laminated, while facing each other, with fourth insulating film 124 interposed therebetween.

In the present exemplary embodiment, common electrode 30 is formed on third insulating film 123. Fourth insulating film 124 is formed so as to cover common electrode 30, and pixel electrode 10 is formed on fourth insulating film 124. Specifically, first pixel electrode 11 and second pixel electrode 12 are formed on fourth insulating film 124 in a predetermined shape as pixel electrode 10. At this time, bridge electrode 13 is also formed together with first pixel electrode 11 and second pixel electrode 12. That is, first pixel electrode 11, second pixel electrode 12, and bridge electrode 13 are formed in the same layer, and are formed by patterning the same conductive film.

Pixel electrode 10 and common electrode 30 are transparent electrodes made of a transparent metal oxide such as indium tin oxide (ITO). Fourth insulating film 124 is made of an inorganic insulating film such as a silicon nitride film, for example. Fourth insulating film 124 that is an inorganic insulating film can be formed by, for example, a CVD method.

As described above, common electrode 30 is a planar solid electrode formed over all pixels PX. Accordingly, the wirings such as video signal lines 40 and scanning lines 50 are covered by common electrode 30, so that the electric field generated by the wirings such as video signal lines 40 and scanning lines 50 can be shielded by common electrode 30. That is, the electric field generated in the TFT layer can be shielded by common electrode 30. Accordingly, the degree of freedom in designing the shape and size of pixel electrode 10 formed on common electrode 30 is improved, whereby the light transmittance and the aperture ratio of pixel PX can be easily improved.

Opening 30a is formed in common electrode 30, which is a thin-film planar solid electrode, in an area above scanning line 50 in order to connect source electrode 20S of transistor 20 and pixel electrode 10, as shown in FIGS. 3 and 4. Therefore, opening 30a in common electrode 30 is provided with a contact hole that penetrates the three-layered insulating layer including second insulating film 122, third insulating film 123, and fourth insulating film 124, and in each pixel PX, source electrode 20S of transistor 20 and pixel electrode 10 are connected via the contact hole.

Alignment film 60 is formed on pixel electrode 10. Alignment film 60 is formed over the entire surface of fourth insulating film 124 so as to cover pixel electrode 10. Alignment film 60 is in contact with liquid crystal layer 300, and controls the initial alignment angle of liquid crystal molecules of liquid crystal layer 300. In the present exemplary embodiment, alignment film 60 is rubbed in order to align the initial alignment angles of the liquid crystal molecules in a certain direction.

Although not shown, a plurality of common lines made of a low resistance material such as copper may be provided in contact with common electrode 30. For example, the common line is formed immediately above common electrode 30. The common line made of a copper wire has a light shielding property. Therefore, the common line may be provided to overlap video signal line 40 or scanning line 50 covered with black matrix BM.

Next, second substrate 200 will be described. Second substrate 200 is a counter substrate that faces first substrate 100. Second substrate 200 includes second transparent base 210 and black matrix BM formed on second transparent base 210. Similar to first transparent base 110, second transparent base 210 is a transparent substrate such as a glass substrate, for example.

Black matrix BM is a black light shielding layer and is made of, for example, carbon black. Black matrix BM is formed on the surface of second transparent base 210 on the liquid crystal layer 300 side. In the present exemplary embodiment, black matrix BM is formed in a matrix pattern so as to cover video signal lines 40 and scanning lines 50. The width of black matrix BM is larger than the width of video signal line 40 and scanning line 50.

When liquid crystal display panel 2 displays a color image, second substrate 200 is a color filter substrate (CF substrate) having a color filter. In this case, each of the plurality of pixels PX is any one of a red pixel, a green pixel, and a blue pixel, and a red color filter, a blue color filter, and a green color filter are formed so as to respectively correspond to the red pixel, the green pixel, and the blue pixel. The color filters are formed in opening areas of black matrix BM (that is, in opening portions of black matrix BM). On the other hand, when liquid crystal display panel 2 displays a monochrome image, no color filter is formed on second substrate 200.

Second substrate 200 includes a plurality of spacers 220. Spacers 220 are formed on second transparent base 210 so as to protrude toward first substrate 100. Spacers 220 are columnar members for maintaining a constant distance (cell gap) between first substrate 100 and second substrate 200. That is, the thickness of liquid crystal layer 300 can be kept constant by spacers 220. As an example, spacers 220 have a cylindrical trapezoid shape. Spacers 220 are made of a resin material such as acrylic resin and can be elastically deformed. Spacers 220 can be patterned by, for example, photolithography.

A pair of polarizing plates (not shown) is bonded to liquid crystal display panel 2 configured as described above. For example, one of the pair of polarizing plates is formed on the outer surface of first substrate 100, and the other of the pair of polarizing plates is formed on the outer surface of second substrate 200. The pair of polarizing plates is disposed so that the polarization directions are orthogonal to each other. In addition, retardation plates may be bonded to the pair of polarizing plates.

In liquid crystal display device 1, liquid crystal display panel 2 may be disposed such that, for example, first substrate 100 is located on the backlight 3 side and second substrate 200 is located on an observer side, or vice versa.

Figure 7:
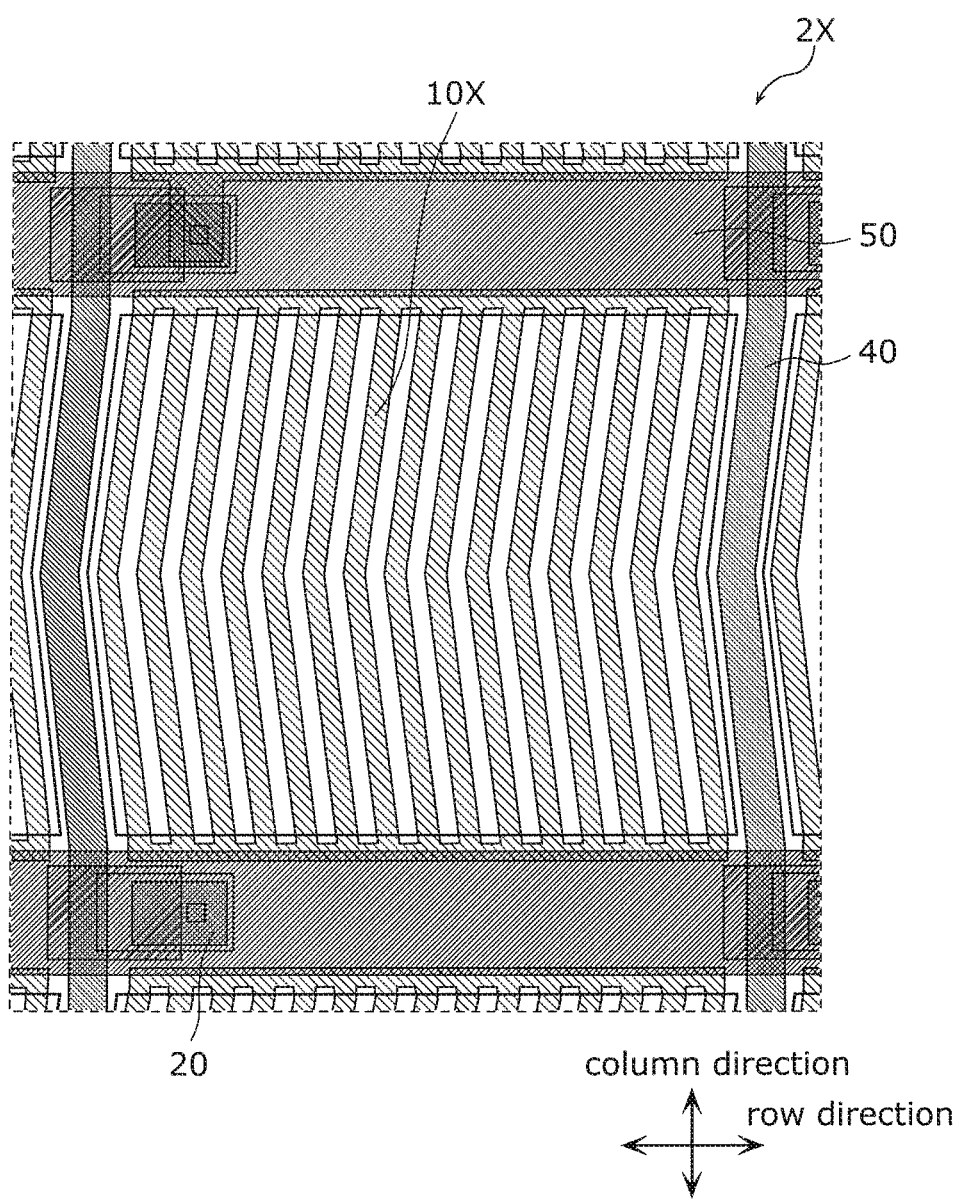
FIG. 7 is a view showing a pixel layout of liquid crystal display panel according to a first comparative example.
Figure 8:
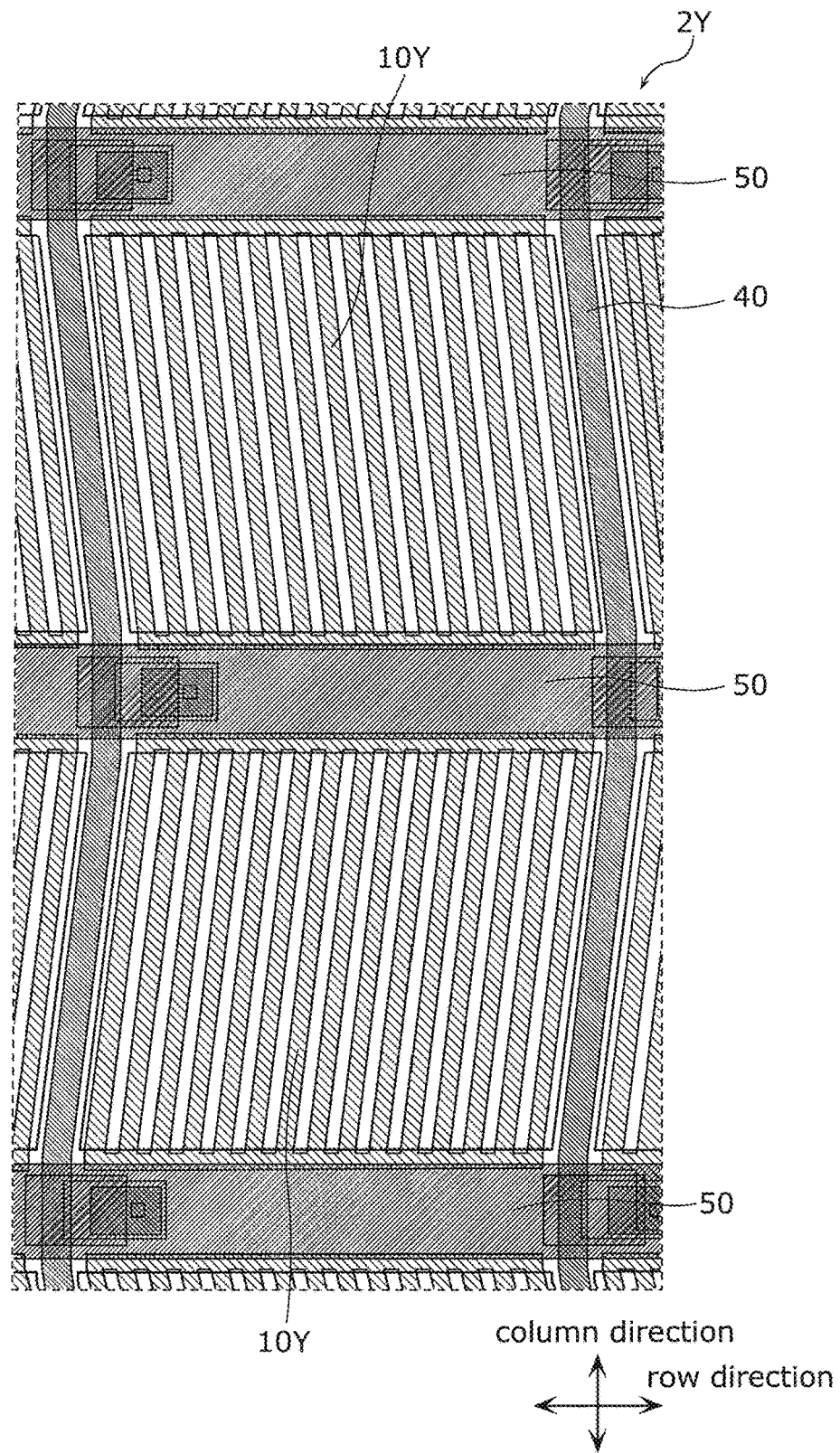
FIG. 8 is a view showing a pixel layout of liquid crystal display panel according to a second comparative example.

Next, effects of liquid crystal display panel 2 according to the first exemplary embodiment will be described with reference to FIGS. 7 and 8, along with the background of the present disclosure. FIG. 7 is a view showing a pixel layout of liquid crystal display panel 2X according to a first comparative example. FIG. 8 is a view showing a pixel layout of liquid crystal display panel 2Y according to a second comparative example.

Liquid crystal display panel 2X according to the first comparative example shown in FIG. 7 is a transverse electric field mode liquid crystal display panel of an intra-pixel multi-domain type.

As shown in FIG. 7, in transverse electric field mode liquid crystal display panel 2X of an intra-pixel multi-domain type, a bent portion is formed in a part of each pixel electrode 10X in one pixel by bending pixel electrode 10X in a "lateral-V" shape. Therefore, transverse electric field mode liquid crystal display panel 2X of an intra-pixel multi-domain type shown in FIG. 7 can achieve excellent color viewing angle characteristics and wide viewing angle characteristics. However, liquid crystal molecules are less likely to rotate at the bent portions of pixel electrodes 10X, resulting in that an aperture ratio is lower than that of a transverse electric field mode liquid crystal display panel including a plurality of linear pixel electrodes having no bent portions.

In view of this, liquid crystal display panel 2Y according to the second comparative example shown in FIG. 8 is considered. Liquid crystal display panel 2Y according to the second comparative example shown in FIG. 8 is a transverse electric field mode liquid crystal display panel of a pixel-basis multi-domain type.

Liquid crystal display panel 2Y according to the second comparative example shown in FIG. 8 is configured such that one bent portion is formed in two pixels by changing the directions of pixel electrodes 10Y of two pixels adjacent to each other, without forming bent portions in pixel electrodes 10Y within one pixel. Therefore, liquid crystal display panel 2Y according to the second comparative example shown in FIG. 8 can suppress a decrease in aperture ratio, as compared to liquid crystal display panel 2X according to the first comparative example shown in FIG. 7. However, since horizontal viewing angle characteristics are different for each row, viewing angle characteristics deteriorate.

As a result of intensive studies on such problems, the inventors of the present disclosure have found that a decrease in aperture ratio can be suppressed by designing a layout within a pixel even in a transverse electric field mode liquid crystal display panel of an intra-pixel multi-domain type.

Specifically, liquid crystal display panel 2 according to the present exemplary embodiment is a transverse electric field mode liquid crystal display panel of an intra-pixel multi-domain type, and in each of a plurality of pixels PX, pixel electrode 10 includes first pixel electrode 11 having the plurality of first line electrodes 11L extending in a first direction in a stripe pattern, and second pixel electrode 12 having the plurality of second line electrodes 12L extending in a second direction different from the first direction in a stripe pattern, as shown in FIG. 3.

In liquid crystal display panel 2 according to the present exemplary embodiment, first pixel electrode 11 provided in first domain D1 and second pixel electrode 12 provided in second domain D2 are separated across video signal line 40 in the row direction, and are connected to each other by bridge electrode 13 extending over video signal line 40.

With this configuration, the boundary (domain boundary) between first domain D1 and second domain D2 can be overlapped with black matrix BM (non-opening portion) that covers video signal line 40 (metal layer). Thus, it is possible to suppress a decrease in aperture ratio even in liquid crystal display panel 2 of an intra-pixel multi-domain type.

In this case, in each of the plurality of pixels PX, the tip of at least one of the plurality of first line electrodes 11L from among the plurality of first line electrodes 11L and the tip of at least one of the plurality of second line electrodes 12L from among the plurality of second line electrodes 12L may overlap video signal line 40 corresponding to pixel PX, as in the present exemplary embodiment. In the present exemplary embodiment, in each pixel PX, the tip of first finger electrode portion 11L2 of the plurality of first line electrodes 11L and the tip of second finger electrode portion 12L2 of the plurality of second line electrodes 12L overlap the video signal line.

With this configuration, even if pixel electrode 10 is divided into first pixel electrode 11 and second pixel electrode 12 with video signal line 40 as a boundary, first pixel electrode 11 and second pixel electrode 12 can be formed up to the edge of video signal line 40, whereby a decrease in aperture ratio can be suppressed.

Further, in the present exemplary embodiment, second pixel electrode 12 of one pixel PX (for example, pixel PX1 in FIG. 3) of two adjacent pixels PX and first pixel electrode 11 of the other pixel PX (for example, pixel PX2 in FIG. 3) of two adjacent pixels PX are provided between two adjacent video signal lines 40.

With this configuration, a boundary between two adjacent pixels PX can be positioned between two adjacent video signal lines 40.

In this case, in two adjacent pixels PX, second end electrode 12La located closest to the plurality of first line electrodes 11L of other pixel PX (for example, pixel PX2 in FIG. 3) from among the plurality of second line electrodes 12L in one pixel PX (for example, pixel PX1 in FIG. 3) is adjacent to first end electrode 11La located closest to the plurality of second line electrodes 12L of one pixel PX from among the plurality of first line electrodes 11L in other pixel PX.

With this configuration, first pixel electrode 11 and second pixel electrode 12 can be positioned up to the boundary between two adjacent pixels PX. That is, the boundary between two adjacent pixels PX can be positioned in an opening. Thus, a decrease in aperture ratio can be further suppressed.

In the present exemplary embodiment, in two adjacent pixels PX, the distance between first end electrode 11La of other pixel PX and second end electrode 12La of one pixel PX, the pitch of the plurality of first line electrodes 11L and the pitch of the plurality of second line electrodes 12L are the same.

With this configuration, in two adjacent pixels PX, the pitch of pixel electrode 10 can be made uniform not only within each pixel PX but also between two adjacent pixels PX, whereby a decrease in aperture ratio can be suppressed still further.

In two adjacent pixels PX, the distance between first end electrode 11La of other pixel PX (for example, pixel PX2 in FIG. 3) and second end electrode 12La of one pixel PX (for example, pixel PX1 in FIG. 3) may be greater than the pitch of the plurality of first line electrodes 11L and the pitch of the plurality of second line electrodes 12L.

With this configuration, in two adjacent pixels PX, pixel electrode 10 of one pixel PX and pixel electrode 10 of other pixel PX, which are at different potentials, can be moved away from each other, whereby interference of the electric field between the pixels can be suppressed. When liquid crystal display panel 2 displays a color image, two adjacent pixels PX are different in color, and with the above configuration, pixel electrodes 10 of two adjacent pixels PX can be kept away from each other, whereby color mixing can be suppressed.

Further, in two adjacent pixels PX, the second direction that is the extending direction of the plurality of second line electrodes 12L in one pixel PX (for example, pixel PX1 in FIG. 3) and the first direction that is the extending direction of the plurality of first line electrodes 11L in other pixel PX (for example, pixel PX2 in FIG. 3) are the same.

With this configuration, an ineffective region existing at the boundary between two adjacent pixels PX can be reduced, so that the decrease in aperture ratio can be further suppressed.

In the present exemplary embodiment, the plurality of pixels PX is aligned throughout the entire image display region, and transistor 20 of one pixel PX and transistor 20 of other pixel PX of two adjacent pixels PX are provided to overlap same scanning line 50. However, the present disclosure is not limited thereto.

Figure 9:
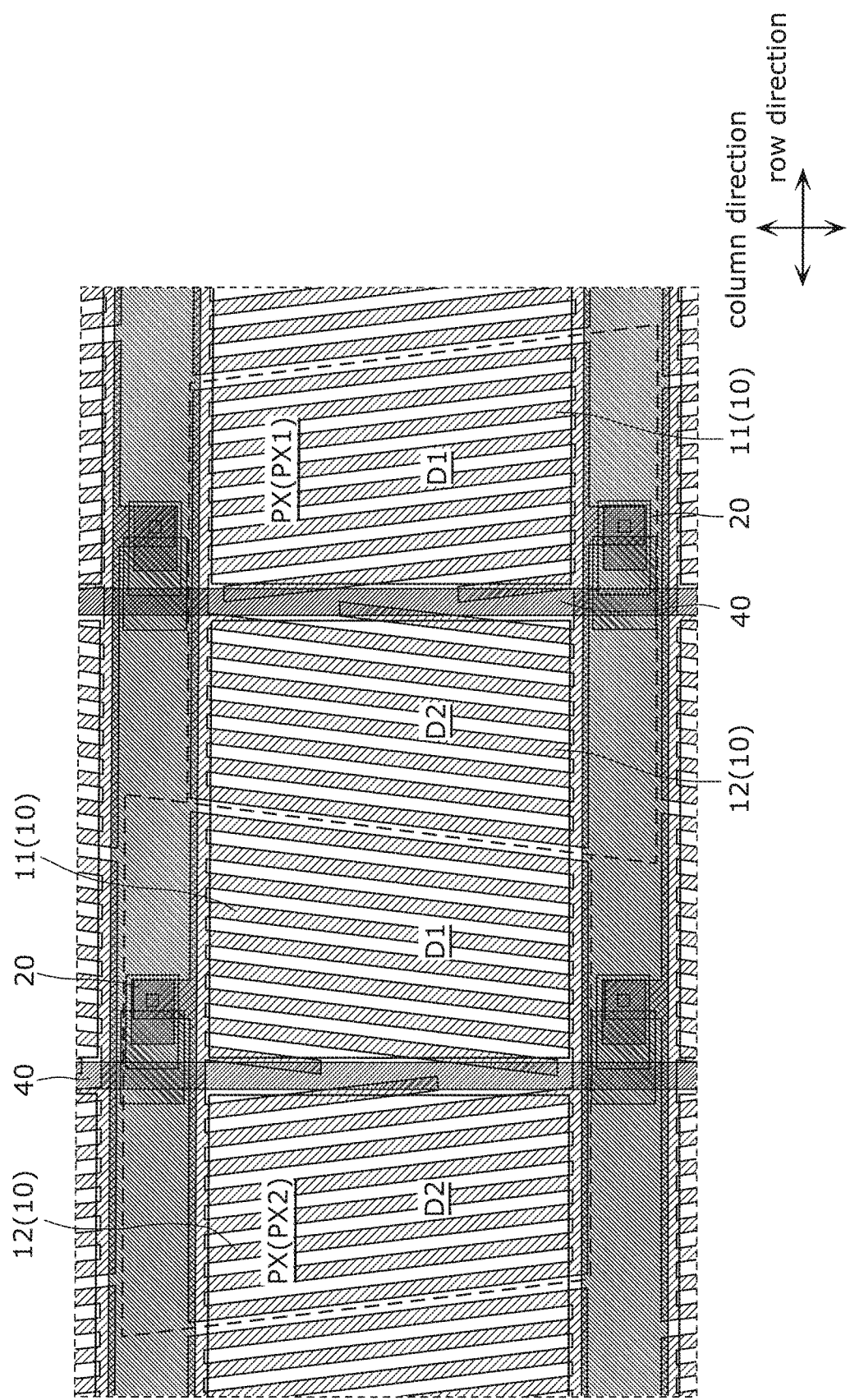
FIG. 9 is a plan view showing a layout of pixels of liquid crystal display panel according to a modification of the first exemplary embodiment.

For example, as shown in FIG. 9, transistor 20 of one pixel PX (right pixel PX1 in FIG. 9) and transistor 20 of other pixel PX (left pixel PX2 in FIG. 9) of two adjacent pixels PX may be provided to overlap different scanning lines 50. Specifically, transistors 20 of two pixels PX adjacent to each other in the row direction may be provided at positions alternately inverted in the direction in which video signal line 40 extends for each column. That is, in FIG. 9, the plurality of pixels PX and transistors 20 are arranged in a staggered manner in a vertical direction in a planar view.

With this configuration, the difference in pixel capacitance between pixel electrode 10 and common electrode 30 can be reduced for two pixels PX adjacent to each other in the row direction. For example, the pixel capacitances of two pixels PX adjacent to each other in the row direction can be made the same. Thus, the quality of a display image can be improved. In FIG. 9, one pixel PX is indicated by a region enclosed by a dashed trapezoid.

Second Exemplary Embodiment

Figure 10:
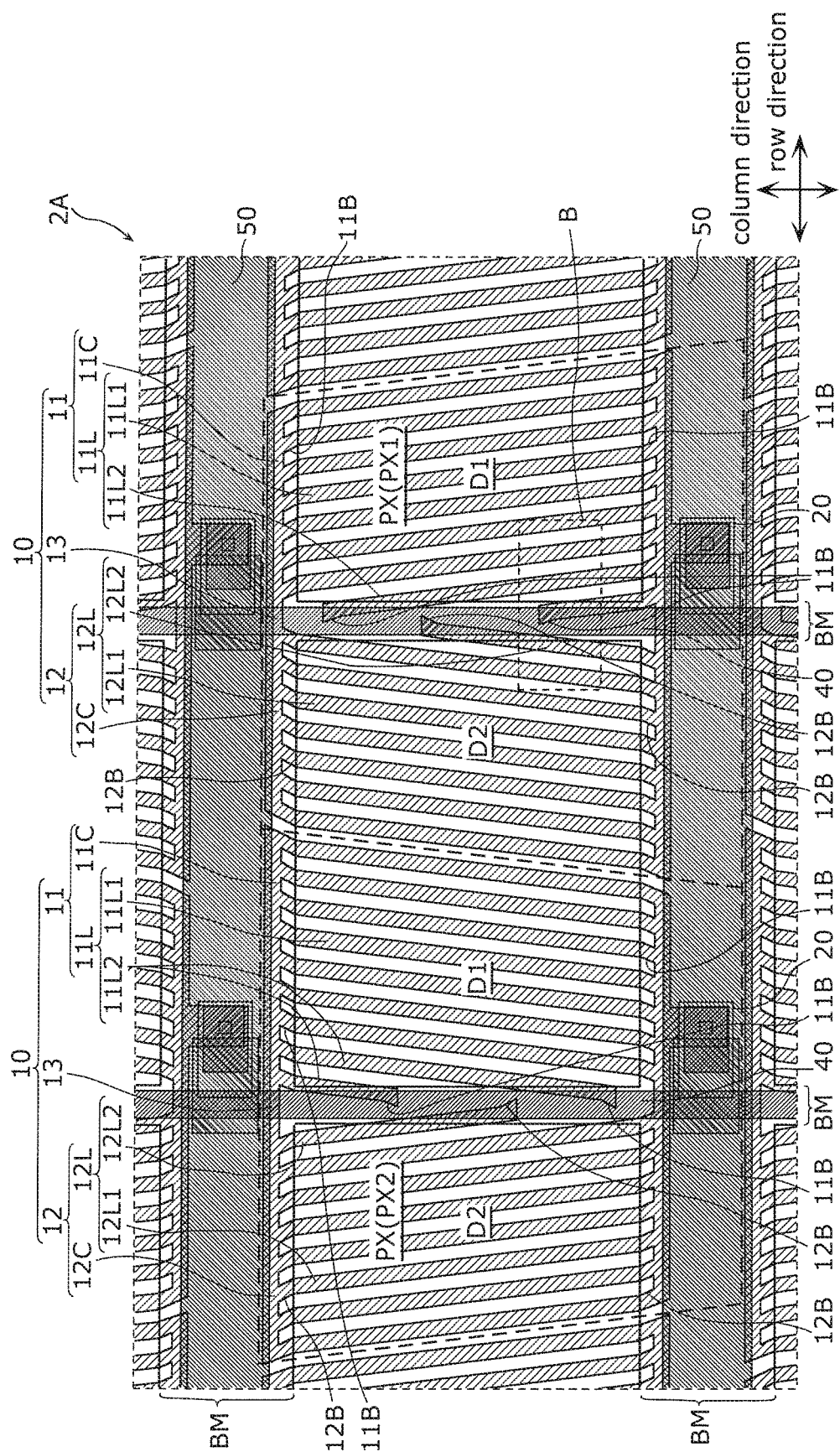
FIG. 10 is a plan view showing a layout of pixels of liquid crystal display panel according to a second exemplary embodiment.
Figure 11:
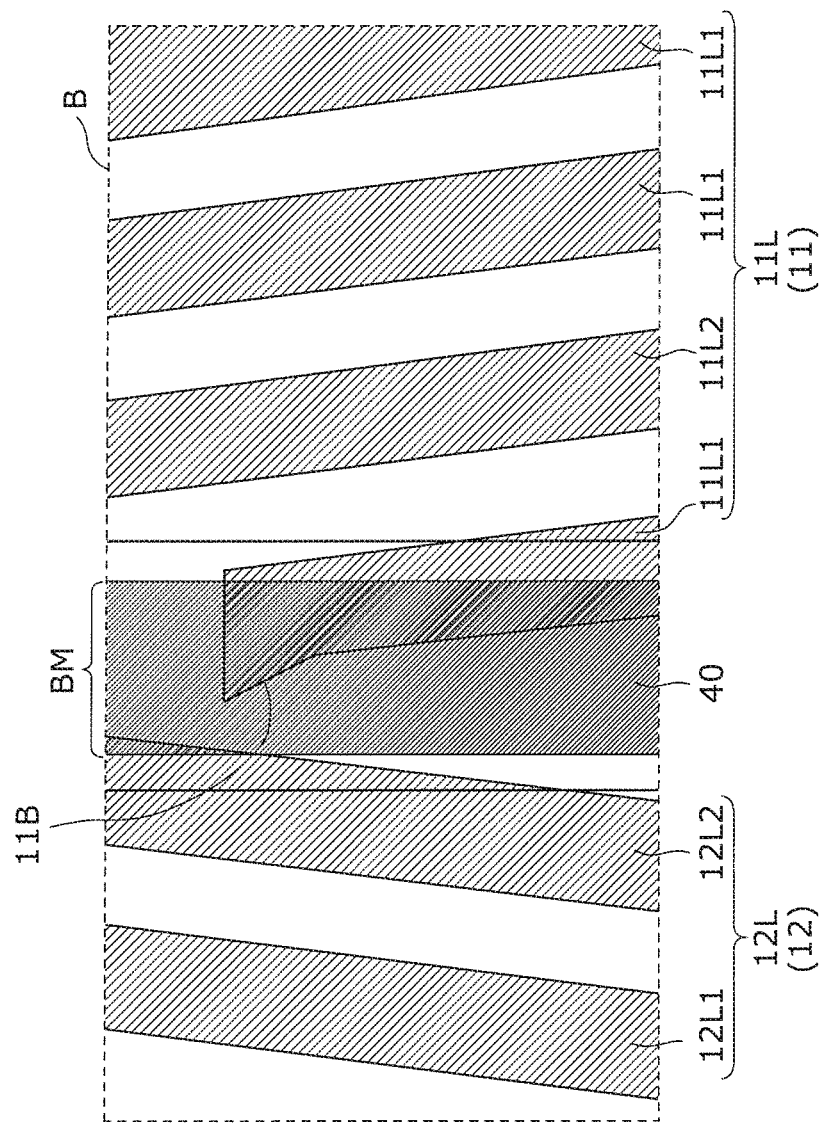
FIG. 11 is a partial enlarged view of pixels in liquid crystal display panel according to the second exemplary embodiment.

Next, a second exemplary embodiment will be described with reference to FIG. 10. FIGS. 10 and 11 are plan views showing a layout of pixels PX of liquid crystal display panel 2A used in a liquid crystal display device according to the second exemplary embodiment. FIG. 11 is an enlarged view of region B enclosed by a dashed line in FIG. 10. In FIG. 10, one pixel PX is indicated by a region enclosed by a dashed trapezoid.

Liquid crystal display panel 2A according to the present exemplary embodiment is different from liquid crystal display panel 2 according to the above exemplary embodiment in that a bent portion as a measure against pressed domain is formed in pixel electrode 10.

Specifically, in liquid crystal display panel 2A according to the present exemplary embodiment, in each pixel PX, first pixel electrode 11 has first bent portion 11B formed by bending a part of the side of at least one of the plurality of first line electrodes 11L from among the plurality of first line electrodes 11L in a direction inclined with respect to the first direction, as shown in FIG. 10. Second pixel electrode 12 includes second bent portion 12B formed by bending a part of the side of at least one of the plurality of second line electrodes 12L in a direction inclined with respect to the second direction.

First bent portion 11B is inclined more than first line electrodes 11L extending in the stripe direction (first direction), and has a greater inclination angle with respect to the column direction. That is, first bent portion 11B has an inclination angle smaller than that of first line electrodes 11L extending in the stripe direction (first direction) with respect to the row direction.

Similarly, second bent portion 12B is inclined more than second line electrodes 12L extending in the stripe direction (second direction), and has a greater inclination angle with respect to the column direction. That is, second bent portion 12B has an inclination angle smaller than that of second line electrodes 12L extending in the stripe direction (second direction) with respect to the row direction.

As shown in FIGS. 10 and 11, first bent portion 11B of first pixel electrode 11 is formed at the tip of first finger electrode portion 11L2 in which one of both ends is open. Further, second bent portion 12B of second pixel electrode 12 is formed at the tip of second finger electrode portion 12L2 in which one of both ends is open.

In each of the plurality of pixels PX, at least one of first bent portion 11B and second bent portion 12B may overlap video signal line 40 corresponding to pixel PX. In the present exemplary embodiment, both first bent portion 11B and second bent portion 12B overlap video signal line 40.

Further, in the present exemplary embodiment, first bent portions 11B are formed not only at the tip of first line electrode 11L in which one end is open without being connected to first connection electrode 11C but also at both ends of first line electrodes 11L in which both ends are connected to first connection electrodes 11C. In other words, first bent portions 11B are also formed in connection portions (base portions) of first line electrodes 11L with first connection electrodes 11C.

Similarly, second bent portions 12B are formed not only at the tip of second line electrode 12L in which one end is open without being connected to second connection electrode 12C but also at both ends of second line electrodes 12L in which both ends are connected to second connection electrodes 12C. In other words, second bent portions 12B are also formed in connection portions (base portions) of second line electrodes 12L with second connection electrodes 12C.

Figure 12:
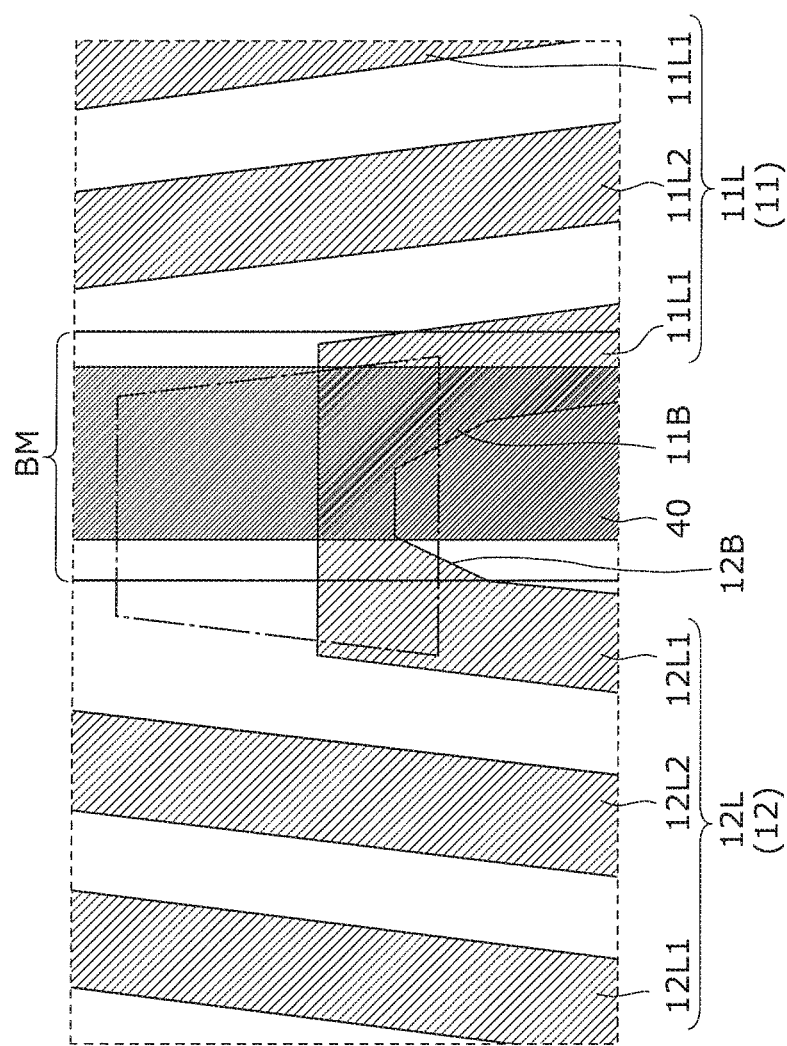
FIG. 12 is a partial enlarged view of another example of pixels in liquid crystal display panel according to the second exemplary embodiment.

In the present exemplary embodiment, first line electrode 11L of first pixel electrode 11 and second line electrode 12L of second pixel electrode 12 in each pixel PX are not connected to each other at a position overlapping video signal line 40 as shown in FIG. 11. However, the present disclosure is not limited thereto. For example, first line electrode 11L of first pixel electrode 11 and second line electrode 12L of second pixel electrode 12 in each pixel PX may be connected to each other at a position overlapping video signal line 40 as shown in FIG. 12. In FIG. 12, in a region enclosed by a dot-and-dash line, liquid crystal molecules are less likely to rotate, and light is not easily transmitted through this region.

Figure 13:
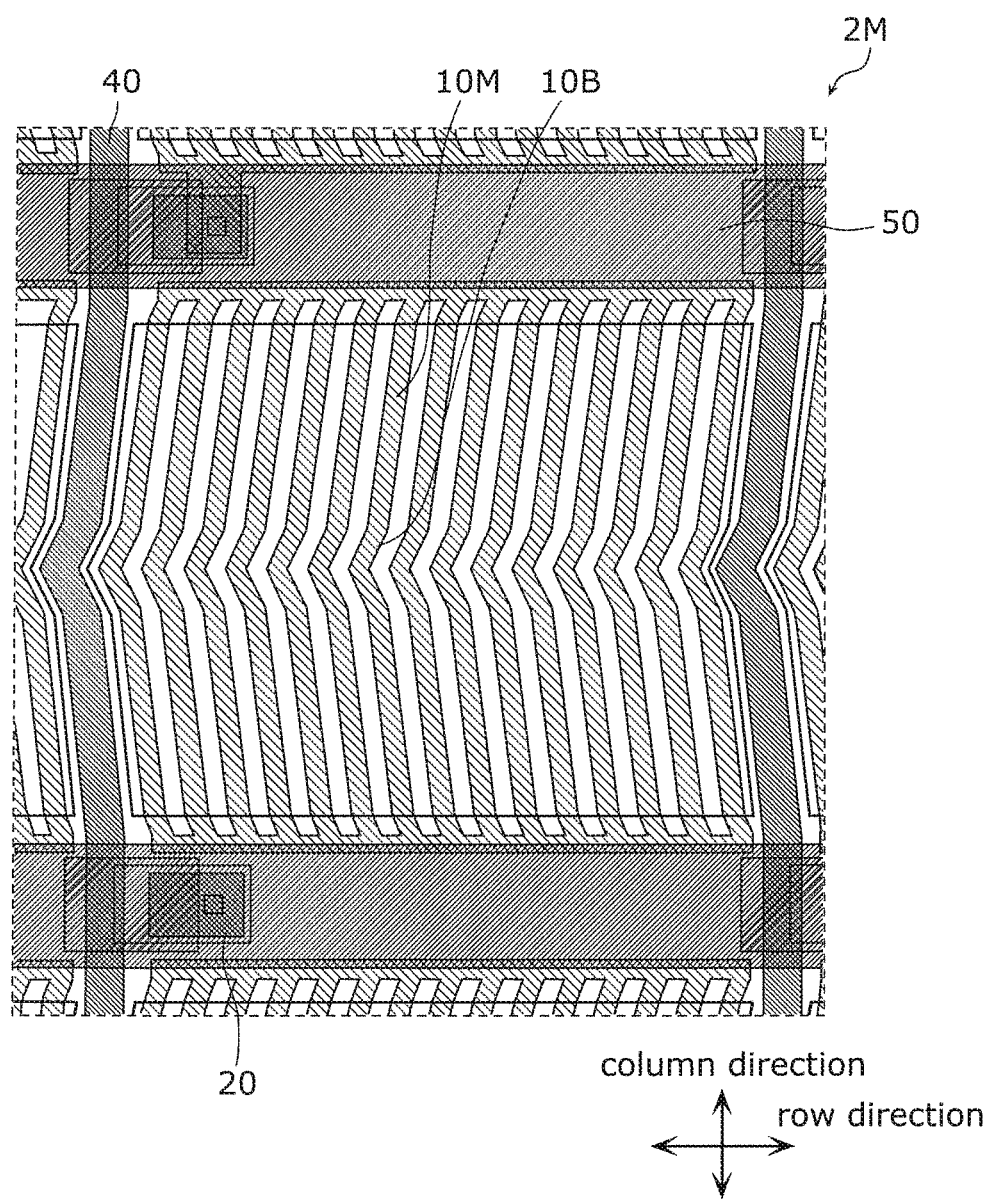
FIG. 13 is a view showing a pixel layout of liquid crystal display panel according to a third comparative example.
Figure 14:
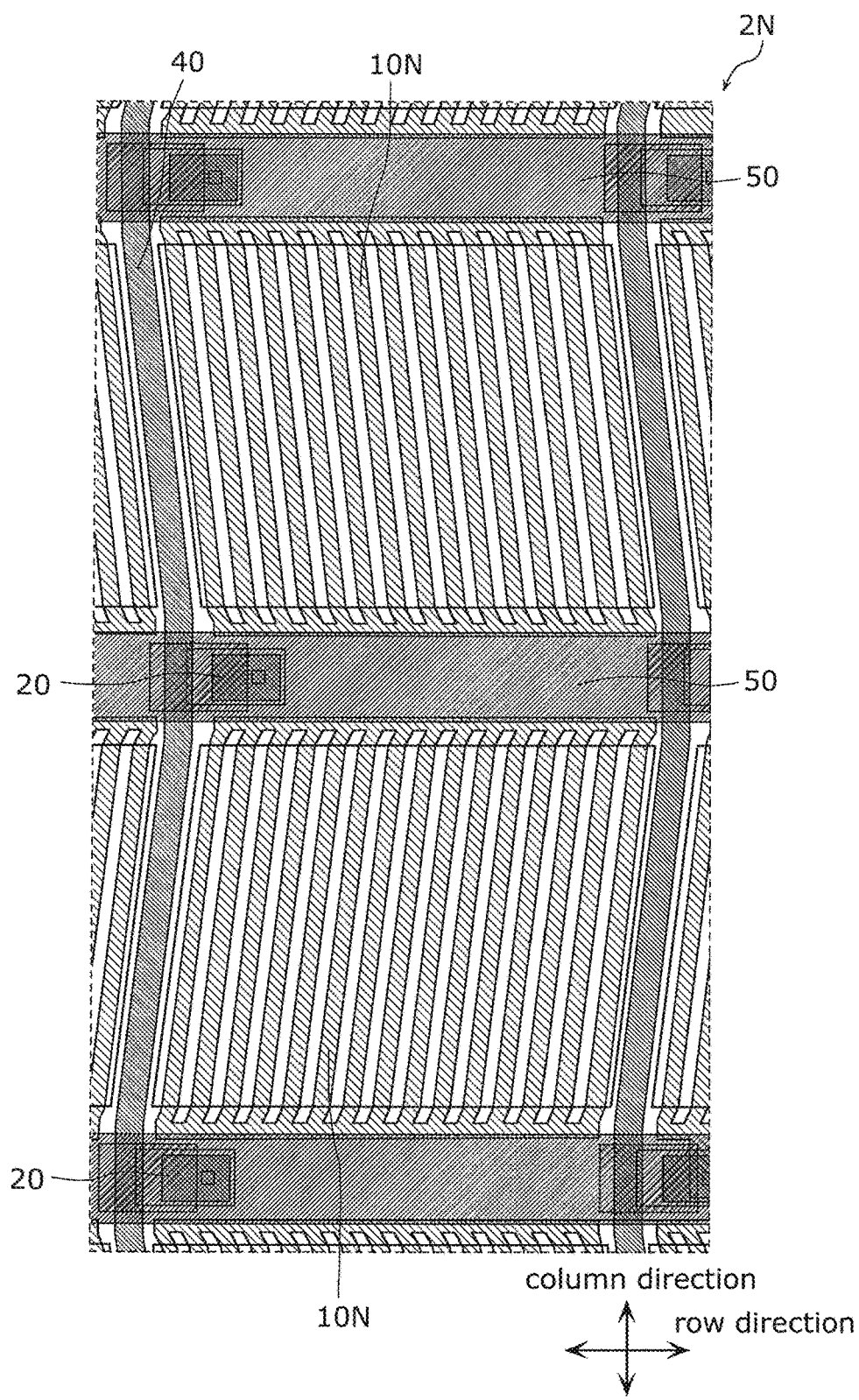
FIG. 14 is a view showing a pixel layout of liquid crystal display panel according to a fourth comparative example.

Next, effects of liquid crystal display panel 2A according to the present exemplary embodiment will be described with reference to FIGS. 13 and 14. FIG. 13 is a view showing a pixel layout of liquid crystal display panel 2M according to a third comparative example. FIG. 14 is a view showing a pixel layout of liquid crystal display panel 2N according to a fourth comparative example.

Liquid crystal display panel 2M according to the third comparative example shown in FIG. 13 is a transverse electric field mode liquid crystal display panel of an intra-pixel multi-domain type provided with a measure against pressed domain.

The pressed domain indicates a domain generated such that, when the surface of a liquid crystal display panel is pressed with a finger or the like, liquid crystal molecules rotate in the pressed portion due to, for example, a partial change in a distance (cell gap) between a TFT substrate and a counter substrate of a liquid crystal cell. For example, in a screen displaying white, the amount of transmitted backlight is reduced at a position where a pressed domain occurs, and the screen becomes dark at this position.

In view of this, in order to suppress such a pressed domain, it is conceivable to form a bent portion having a great inclination in a part of the pixel electrode. For example, liquid crystal display panel 2M shown in FIG. 13 has a multi-domain bent portion formed in pixel electrode 10M by bending pixel electrode 10M into a "lateral-V" shape in order to achieve an intra-pixel multi-domain mode, and also has bent portion 10B which is formed as a measure against pressed domain and which is inclined more than the multi-domain bent portion. In addition, in liquid crystal display panel 2M shown in FIG. 13, the bent portions as measures against pressed domain are also formed at base portions of the line electrodes.

Liquid crystal display panel 2M shown in FIG. 13 can achieve excellent color viewing angle characteristics and wide viewing angle characteristics as in liquid crystal display panel 2X shown in FIG. 7. However, in liquid crystal display panel 2M, the aperture ratio decreases because pixel electrode 10M is bent in a lateral-V shape. In addition, in liquid crystal display panel 2M shown in FIG. 13, the bent portion as a measure against pressed domain is formed in addition to the multi-domain bent portion, so that the aperture ratio is further reduced. That is, in liquid crystal display panel 2M shown in FIG. 13, the aperture ratio is significantly reduced.

In view of this, liquid crystal display panel 2N according to the fourth comparative example shown in FIG. 14 is considered. Liquid crystal display panel 2N according to the fourth comparative example shown in FIG. 14 is a transverse electric field mode liquid crystal display panel of a pixel-basis multi-domain type.

Liquid crystal display panel 2N according to the fourth comparative example shown in FIG. 14 is configured such that one bent portion is formed in two pixels by changing the directions of pixel electrodes 10N of two pixels adjacent to each other, without forming a multi-domain bent portion within one pixel. Further, in liquid crystal display panel 2N according to the fourth comparative example shown in FIG. 14, bent portions as measures against pressed domain are formed only at the base portions of line electrodes. For this reason, a decrease in the aperture ratio can be suppressed more in liquid crystal display panel 2N according to the fourth comparative example shown in FIG. 14 than in liquid crystal display panel 2M according to the third comparative example shown in FIG. 13. However, in liquid crystal display panel 2N according to the fourth comparative example shown in FIG. 14, horizontal viewing angle characteristics are different for each row, so that the viewing angle characteristics deteriorate.

In view of this, in liquid crystal display panel 2A in the present exemplary embodiment, pixel electrode 10 includes first pixel electrode 11 having the plurality of first line electrodes 11L extending in a first direction in a stripe pattern, and second pixel electrode 12 having the plurality of second line electrodes 12L extending in a second direction different from the first direction in a stripe pattern, as in liquid crystal display panel 2 in the above exemplary embodiment.

In liquid crystal display panel 2A according to the present exemplary embodiment, first pixel electrode 11 provided in first domain D1 and second pixel electrode 12 provided in second domain D2 are also separated across video signal line 40 in the row direction, and connected to each other by bridge electrode 13 extending over video signal line 40.

With this configuration, the boundary (domain boundary) between first domain D1 and second domain D2 can be overlapped with black matrix BM (non-opening portion) that covers video signal line 40. Thus, it is possible to suppress a decrease in aperture ratio even in liquid crystal display panel 2A of an intra-pixel multi-domain type.

Further, in liquid crystal display panel 2A in the present exemplary embodiment, in each pixel PX, first pixel electrode 11 is formed with first bent portion 11B, and second pixel electrode 12 is formed with second bent portion 12B as a measure against pressed domain, first bent portion 11B and second bent portion 12B overlapping video signal line 40.

Thus, even if first bent portion 11B and second bent portion 12B are formed as measures against pressed domain, a decrease in aperture ratio can be suppressed. That is, first bent portion 11B and second bent portion 12B as measures against pressed domain can be formed without decreasing the aperture ratio.

In this case, although first bent portion 11B may be formed on both sides of each of first line electrodes 11L, first bent portion 11B is formed only on a portion overlapping video signal line 40 in both sides of first line electrode 11L and is not formed in a portion not overlapping video signal line 40 in the present exemplary embodiment as shown in FIG. 11. Similarly, second bent portion 12B is formed only in a portion overlapping video signal line 40 in both sides of second line electrode 12L, and is not formed in a portion not overlapping video signal line 40. Specifically, first bent portion 11B is formed at the tip of first finger electrode portion 11L2, and second bent portion 12B is formed at the tip of second finger electrode portion 12L2.

As a result, first bent portion 11B and second bent portion 12B overlap video signal line 40 covered with black matrix BM, and do not overlap the slit opening. Therefore, even if first bent portion 11B and second bent portion 12B are formed as measures against pressed domain, a decrease in aperture ratio can be effectively suppressed.

In the present exemplary embodiment, the plurality of pixels PX is aligned throughout the entire image display region, and transistor 20 of one pixel PX and transistor 20 of other pixel PX of two adjacent pixels PX are provided to overlap same scanning line 50. However, the present disclosure is not limited thereto.

Figure 15:
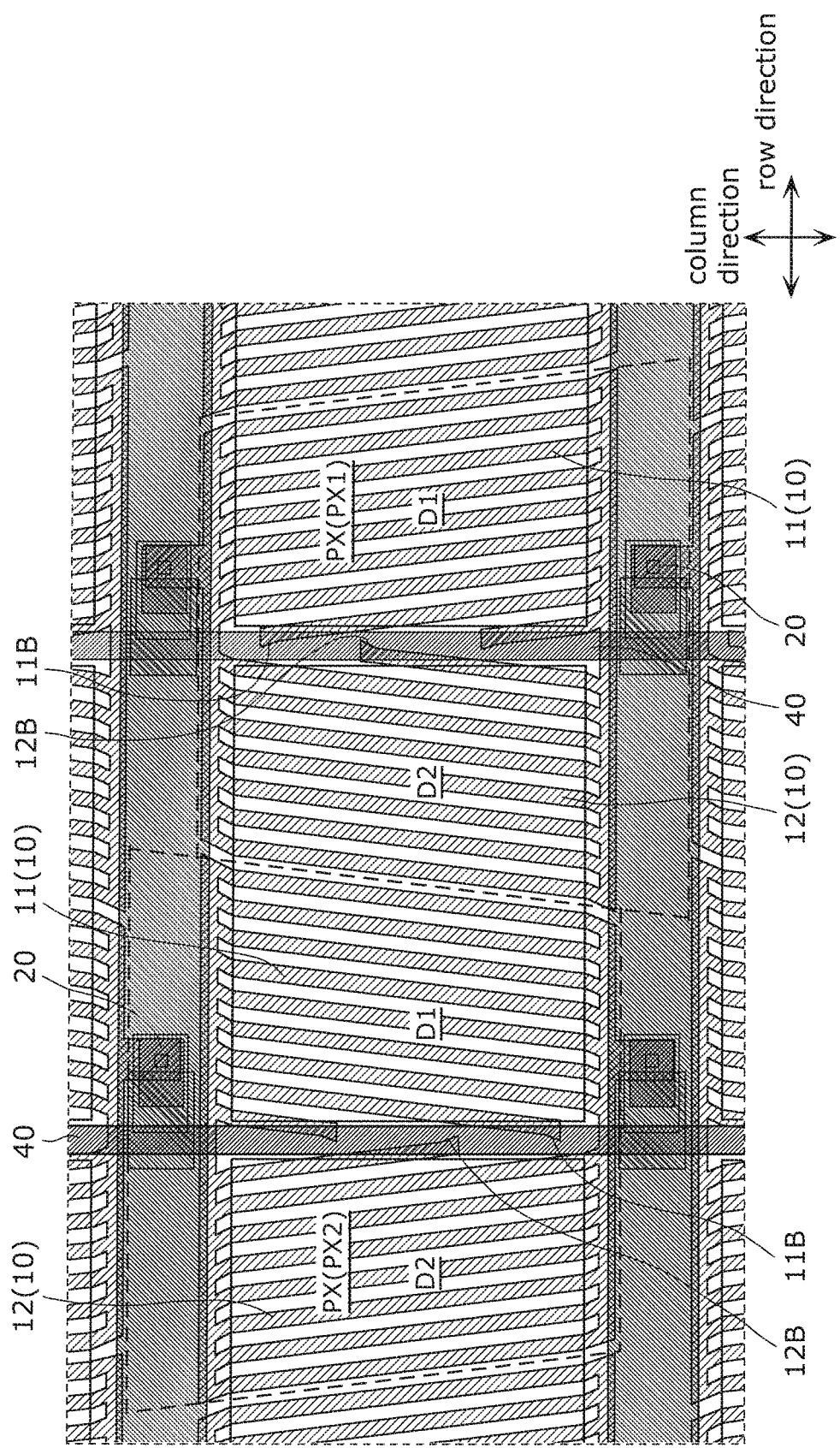
FIG. 15 is a plan view showing a layout of pixels of liquid crystal display panel according to a modification of the second exemplary embodiment.

For example, as shown in FIG. 15, transistor 20 of one pixel PX (right pixel PX1 in FIG. 15) and transistor 20 of other pixel PX (left pixel PX2 in FIG. 15) of two adjacent pixels PX may be provided to overlap different scanning lines 50. Specifically, transistors 20 of two pixels PX adjacent to each other in the row direction may be provided at positions alternately inverted in the direction in which video signal line 40 extends for each column. That is, in FIG. 15, the plurality of pixels PX and transistors 20 are arranged in a staggered manner in a vertical direction in a planar view.

With this configuration, the difference in pixel capacitance between pixel electrode 10 and common electrode 30 can be reduced for two pixels PX adjacent to each other in the row direction. For example, the pixel capacitances of two pixels PX adjacent to each other in the row direction can be made the same. Thus, the quality of a display image can be improved. In FIG. 15, one pixel PX is indicated by a region enclosed by a dashed trapezoid.

Third Exemplary Embodiment

Figure 16:
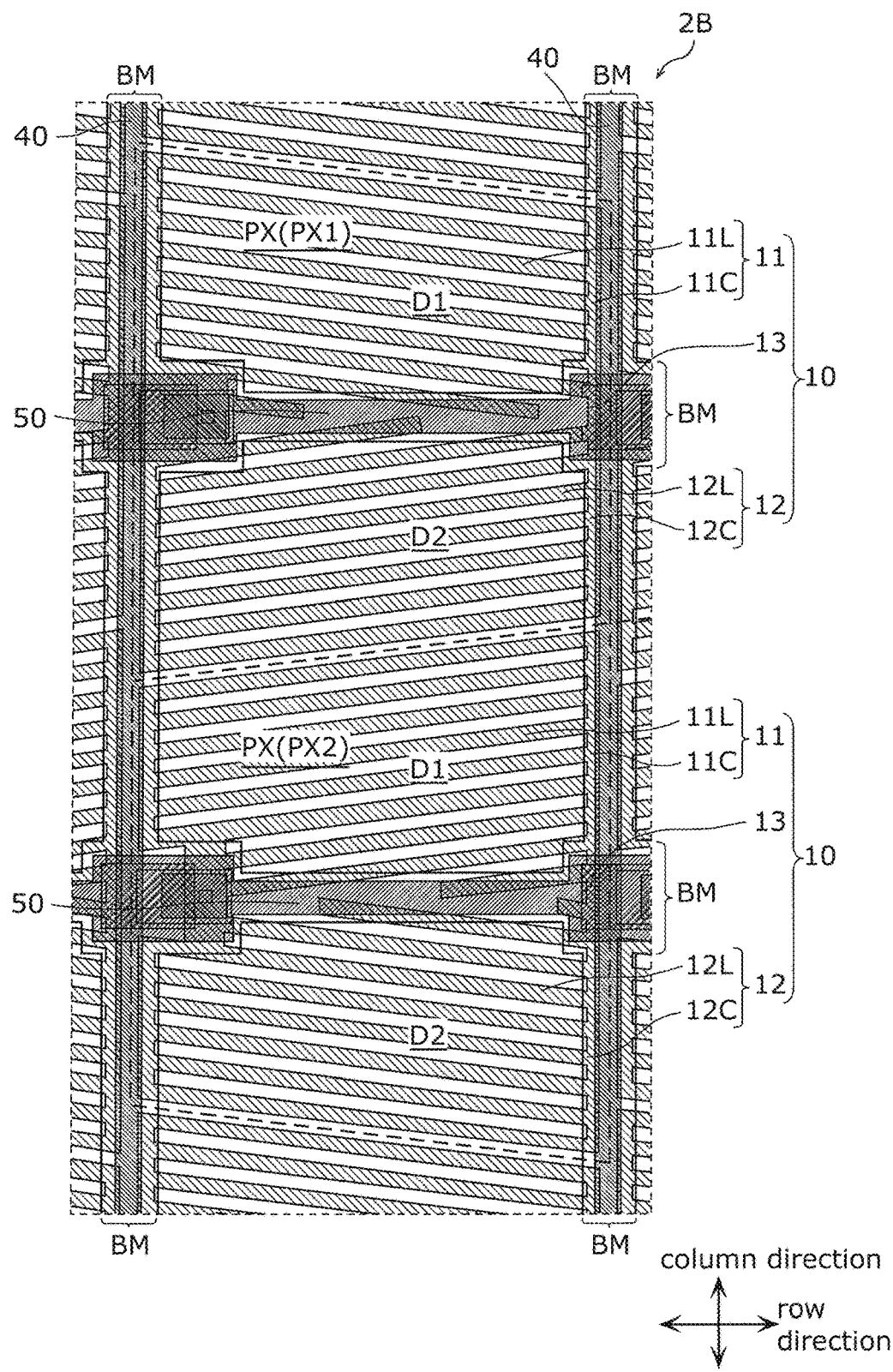
FIG. 16 is a plan view showing a layout of pixels of liquid crystal display panel according to a third exemplary embodiment.

Next, a third exemplary embodiment will be described with reference to FIG. 16. FIG. 16 is a plan view showing a layout of pixels PX of liquid crystal display panel 2B used in a liquid crystal display device according to the third exemplary embodiment. In FIG. 16, one pixel PX is indicated by a region enclosed by a dashed trapezoid.

In liquid crystal display panel 2 in the first exemplary embodiment, first pixel electrode 11 and second pixel electrode 12 are separated across video signal line 40 in each of the plurality of pixels PX. On the other hand, in liquid crystal display panel 2B in the present exemplary embodiment, first pixel electrode 11 and second pixel electrode 12 are separated across scanning line 50 in each of the plurality of pixels PX as shown in FIG. 16. Therefore, bridge electrode 13 connecting first pixel electrode 11 and second pixel electrode 12 extend over scanning line 50. That is, in the present exemplary embodiment, bridge electrode 13 and scanning line 50 intersect in three dimensions.

In liquid crystal display panel 2 in the first exemplary embodiment, the plurality of first line electrodes 11L of first pixel electrode 11 and the plurality of second line electrodes 12L of second pixel electrode 12 mainly extend in the column direction in the entire image display region. On the other hand, in the present exemplary embodiment, the plurality of first line electrodes 11L of first pixel electrode 11 and the plurality of second line electrodes 12L of second pixel electrode 12 mainly extend in the row direction in the entire image display region as shown in FIG. 16.

In liquid crystal display panel 2B according to the present exemplary embodiment, in each pixel PX, the tip of first line electrode 11L positioned closer to scanning line 50 from among the plurality of first line electrodes 11L and the tip of second line electrode 12L positioned closer to scanning line 50 from among the plurality of second line electrodes 12L overlap scanning line 50.

Further, in liquid crystal display panel 2B in the present exemplary embodiment, first pixel electrode 11 of one pixel PX of two adjacent pixels PX and second pixel electrode 12 of other pixel PX are adjacent to each other in the column direction. Therefore, in the present exemplary embodiment, first pixel electrode 11 of one pixel PX of two adjacent pixels PX and second pixel electrode 12 of other pixel PX are provided between two adjacent scanning lines 50.

Liquid crystal display panel 2B according to the present exemplary embodiment described above also provides effects similar to those provided by liquid crystal display panel 2 in the first exemplary embodiment. For example, in liquid crystal display panel 2B according to the present exemplary embodiment, the boundary (domain boundary) between first domain D1 and second domain D2 overlaps black matrix BM (non-opening portion) that covers scanning line 50. Thus, it is possible to suppress a decrease in aperture ratio even in liquid crystal display panel 2B of an intra-pixel multi-domain type.

Note that, in the present exemplary embodiment, first pixel electrode 11 and second pixel electrode 12 may be also formed with bent portions as measures against pressed domain, as in the second exemplary embodiment. In this case, the bent portions as measures against pressed domain may overlap scanning line 50 in the present exemplary embodiment. Thus, the bent portions as measures against pressed domain can be covered with scanning line 50 having a line width larger than that of video signal line 40, so that the length of the bent portions as measures against pressed domain can be increased. Accordingly, the pressed domain can be effectively suppressed as compared with the second exemplary embodiment.

In the present exemplary embodiment, the plurality of pixels PX is aligned throughout the entire image display region, and transistor 20 of one pixel PX and transistor 20 of other pixel PX of two adjacent pixels PX are provided to overlap same video signal line 40. However, the present disclosure is not limited thereto.

Figure 17:
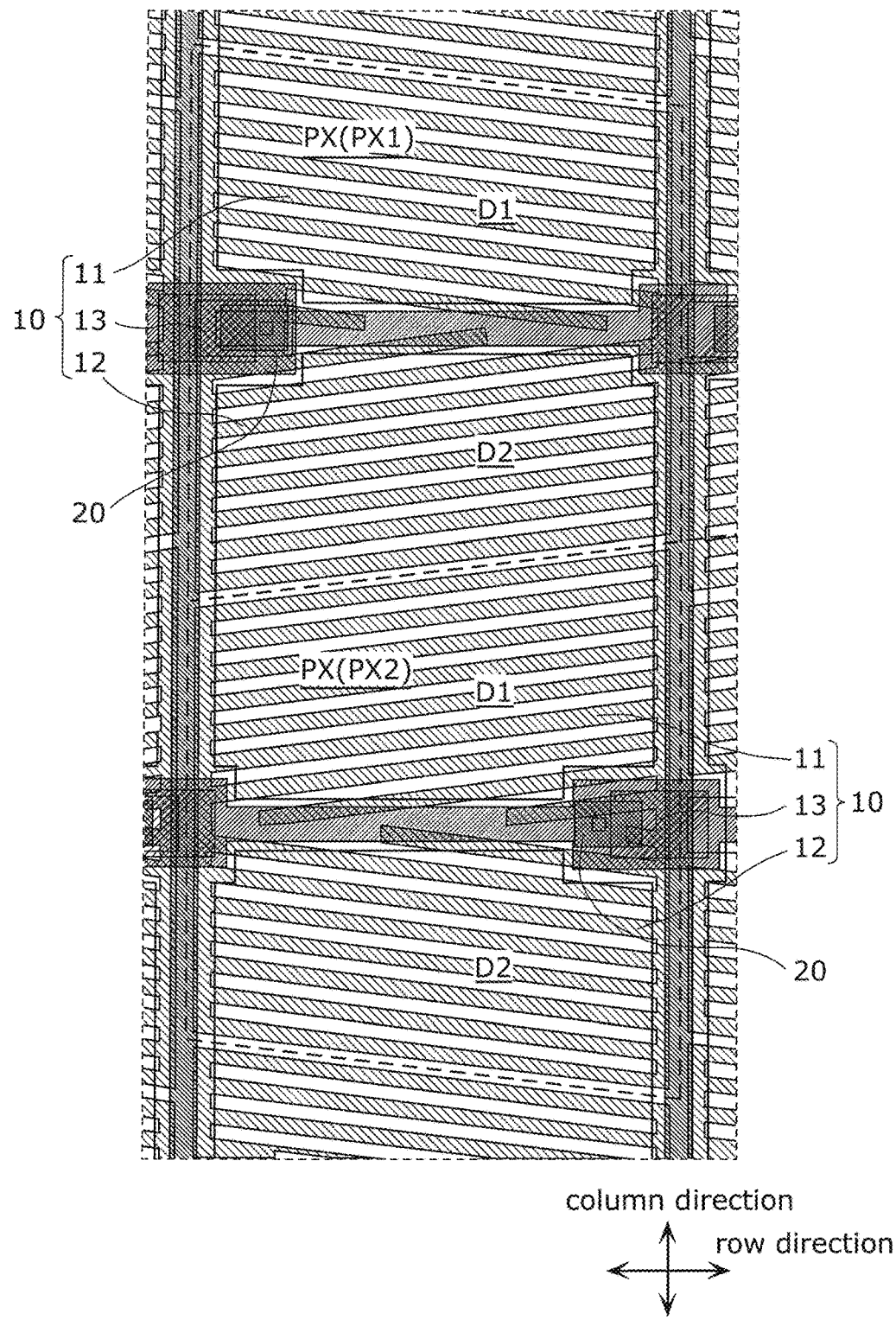
FIG. 17 is a plan view showing a layout of pixels of liquid crystal display panel according to a modification of the third exemplary embodiment.

For example, as shown in FIG. 17, transistor 20 of one pixel PX (upper pixel PX1 in FIG. 17) and transistor 20 of other pixel PX (lower pixel PX2 in FIG. 17) of two adjacent pixels PX may be provided to overlap different video signal lines 40. Specifically, transistors 20 of two pixels PX adjacent to each other in the column direction may be provided at positions alternately inverted in the direction in which scanning line 50 extends for each row. That is, in FIG. 17, the plurality of pixels PX and transistors 20 are arranged in a staggered manner in a horizontal direction in a planar view.

With this configuration, the difference in pixel capacitance between pixel electrode 10 and common electrode 30 can be reduced for two pixels PX adjacent to each other in the column direction. For example, the pixel capacitances of two pixels PX adjacent to each other in the column direction can be made the same. Thus, the quality of a display image can be improved. In FIG. 17, one pixel PX is indicated by a region enclosed by a dashed trapezoid.

Modifications

While the liquid crystal display panel and the liquid crystal display device according to the present disclosure have been described based on the exemplary embodiments, the present disclosure is not limited to the first to third exemplary embodiments.

For example, in the first to third exemplary embodiments, first pixel electrode 11 and second pixel electrode 12 are formed with a plurality of slits, wherein both ends of ladder electrodes are connected. However, the present disclosure is not limited thereto. Specifically, first pixel electrode 11 and second pixel electrode 12 may be comb-shaped electrodes in which only one ends of all line electrodes are connected. That is, first pixel electrode 11 and second pixel electrode 12 may be composed only of finger electrodes.

In the first to third exemplary embodiments, video signal line 40 and drain electrode 20D of transistor 20 are connected, and pixel electrode 10 and source electrode 20S of transistor 20 are connected. However, the present disclosure is not limited thereto. For example, video signal line 40 and source electrode 20S of transistor 20 may be connected, and pixel electrode 10 and drain electrode 20D of transistor 20 may be connected.

In the first to third exemplary embodiments, transistor 20 is connected to first pixel electrode 11 of pixel electrode 10 in each pixel PX. However, the present disclosure is not limited thereto. For example, in each pixel PX, transistor 20 may be connected to second pixel electrode 12 of pixel electrode 10.

In the first to third exemplary embodiments, video signal lines 40 extending in the column direction are linearly formed. However, the present disclosure is not limited thereto. For example, a part of video signal lines 40 extending in the column direction may be bent in a "lateral-V" shape.

In the first to third exemplary embodiments, bridge electrode 13 is formed in the same layer as first pixel electrode 11 and second pixel electrode 12. However, the present disclosure is not limited thereto. For example, bridge electrode 13 may be formed in a different layer from first pixel electrode 11 and second pixel electrode 12. In this case, bridge electrode 13 is connected to first pixel electrode 11 and second pixel electrode 12 through contact holes. When bridge electrode 13 is formed in a different layer from first pixel electrode 11 and second pixel electrode 12, bridge electrode 13 may be formed in the same layer as an existing wiring layer such as a metal layer.

The present disclosure also includes a mode obtained by performing various modifications conceived of by a person skilled in the art on the above first to third exemplary embodiments and a mode achieved by combining any of constituent elements and functions in the first to third exemplary embodiments without departing from the spirit of the present disclosure.

What is claimed is:

1. A liquid crystal display panel having a plurality of pixels arrayed in a matrix, the liquid crystal display panel comprising:
   a plurality of first signal lines extending in a column direction;
   a plurality of second signal lines extending in a row direction;
   a first black matrix and a second black matrix extended in the row direction;
   a transistor provided in each of the plurality of pixels; and
   a pixel electrode provided in each of the plurality of pixels and connected to the first signal line corresponding to the pixel and the second signal line corresponding to the pixel via the transistor corresponding to the pixel,
   wherein, in each of the plurality of pixels,
      the pixel electrode includes a first pixel electrode and a second pixel electrode that are separated across the first signal line corresponding to the pixel and a bridge electrode that extends over the first signal line and connects the first pixel electrode and the second pixel electrode,
      the first pixel electrode has a plurality of first line electrodes extending in a stripe pattern in a first direction,
      the second pixel electrode has a plurality of second line electrodes extending in a stripe pattern in a second direction intersecting the first direction,
      the first black matrix is adjacent to the second black matrix in the column direction,
      the first black matrix and the second black matrix are overlapped by two adjacent second signal lines respectively, and
      no black matrix is disposed at a boundary between the first pixel electrode of one pixel of two adjacent pixels of the plurality of pixels and the second pixel electrode of another pixel of the two adjacent pixels in an area between the first black matrix and the second black matrix.

2. The liquid crystal display panel according to claim 1, wherein, in a planar view, in each of the plurality of pixels, a tip of at least one of the plurality of first line electrodes and a tip of at least one of the plurality of second line electrodes overlap the first signal line corresponding to the pixel.

3. The liquid crystal display panel according to claim 1, wherein the first pixel electrode has a first bent portion formed by bending a part of a side of at least one of the plurality of first line electrodes in a direction inclined with respect to the first direction,
   the second pixel electrode has a second bent portion formed by bending a part of a side of at least one of the plurality of second line electrodes in a direction inclined with respect to the second direction, and
   in each of the plurality of pixels, at least one of the first bent portion and the second bent portion overlaps the first signal line corresponding to the pixel in a planar view.

4. The liquid crystal display panel according to claim 3, wherein
   the plurality of first line electrodes includes a first finger electrode portion having an open end that is one of both ends,
   the plurality of second line electrodes include a second finger electrode portion having an open end that is one of both ends,
   the first bent portion is formed at a tip of the first finger electrode portion, and
   the second bent portion is formed at a tip of the second finger electrode portion.

5. The liquid crystal display panel according to claim 1, wherein the second pixel electrode of the one pixel of two adjacent pixels of the plurality of pixels and the first pixel electrode of the another pixel of the two adjacent pixels are provided between two adjacent first signal lines of the plurality of first signal lines.

6. The liquid crystal display panel according to claim 5, wherein a second end electrode located closest to the plurality of first line electrodes in the other pixel from among the plurality of second line electrodes in the one pixel is adjacent to a first end electrode located closest to the plurality of second line electrodes in the one pixel from among the plurality of first line electrodes in the other pixel.

7. The liquid crystal display panel according to claim 6, wherein a distance between the first end electrode and the second end electrode is greater than a pitch of the plurality of first line electrodes and a pitch of the plurality of second line electrodes.

8. The liquid crystal display panel according to claim 6, wherein a distance between the first end electrode and the second end electrode is equal to a pitch of the plurality of first line electrodes and a pitch of the plurality of second line electrodes.

9. The liquid crystal display panel according to claim 5, wherein the second direction that is an extending direction of the plurality of second line electrodes in the one pixel is equal to the first direction that is an extending direction of the plurality of first line electrodes in the other pixel.

10. The liquid crystal display panel according to claim 1, further comprising a plurality of second signal lines extending in a direction orthogonal to the plurality of first signal lines,
    wherein the transistor of one of two adjacent pixels of the plurality of pixels and the transistor of the other pixel of the two adjacent pixels are provided to overlap different second signal lines of the plurality of second signal lines.

11. The liquid crystal display panel according to claim 1, wherein each of the plurality of first signal lines is a video signal line connected to a source electrode and/or a drain electrode of the transistor.

12. The liquid crystal display panel according to claim 1, wherein each of the plurality of first signal lines is a scanning line connected to a gate electrode of the transistor.

13. The liquid crystal display panel according to claim 11, wherein the bridge electrode over the video signal line overlaps with a scanning line in planar view.

* * * * *